(12) United States Patent
Yanagawa

(10) Patent No.: US 7,092,065 B2
(45) Date of Patent: Aug. 15, 2006

(54) IMAGE DISPLAY DEVICE

(75) Inventor: Kazuhiko Yanagawa, Mobara (JP)

(73) Assignee: Hitachi Displays, Ltd., Mobara (JP)

( * ) Notice: Subject to any disclaimer, the term of this patent is extended or adjusted under 35 U.S.C. 154(b) by 0 days.

(21) Appl. No.: 10/392,876

(22) Filed: Mar. 21, 2003

(65) Prior Publication Data
US 2003/0179438 A1 Sep. 25, 2003

(30) Foreign Application Priority Data
Mar. 22, 2002 (JP) ............................. 2002-079932

(51) Int. Cl.
*C09K 19/52* (2006.01)
(52) U.S. Cl. .................... 349/166; 359/296
(58) Field of Classification Search ................ 349/166, 349/86; 359/296, 259
See application file for complete search history.

(56) References Cited

U.S. PATENT DOCUMENTS 6,650,384 B1 * 11/2003 Oguchi et al. ............... 349/86
6,661,486 B1 * 12/2003 Faris et al. ................. 349/115
6,665,042 B1 * 12/2003 Marshall et al. ............ 349/166
6,980,352 B1 * 12/2005 Tam .......................... 359/296

FOREIGN PATENT DOCUMENTS

JP 2000-194022 A 7/2000

* cited by examiner

*Primary Examiner*—Andrew Schechter
*Assistant Examiner*—David Chung
(74) *Attorney, Agent, or Firm*—Antonelli, Terry, Stout and Kraus, LLP

(57) ABSTRACT

A multi-valued display is produced by an image display device using electronic balls. The image display device includes a first substrate and a second substrate and spherical bodies, which are sandwiched between the first substrate and the second substrate and which are rotatable. Each rotatable spherical body has at least two regions formed by dividing the spherical body in color, and at least first electrodes and second electrodes which apply an electric field to the rotatable spherical bodies. At least an electric field which is generated between the first electrode and the second electrode is applied to the rotatable spherical body, and the image display device further defines a plurality of regions which differ in the intensity of the electric field in the pixel.

18 Claims, 14 Drawing Sheets

FIG. 16A  FIG. 16B  FIG. 16C
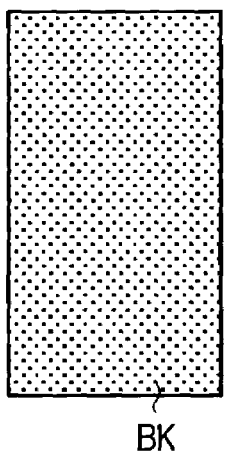
BK
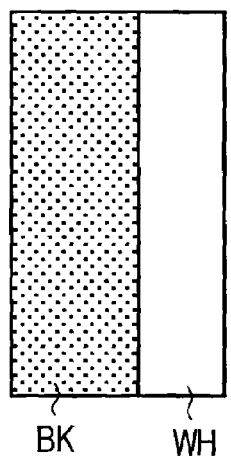
BK  WH
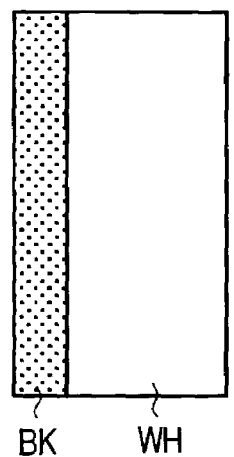
BK  WH
FIG. 18A  FIG. 18B  FIG. 18C
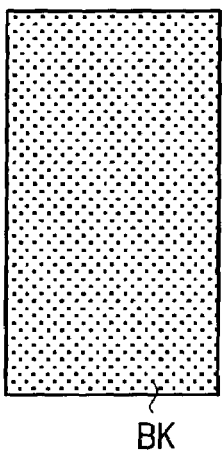
BK
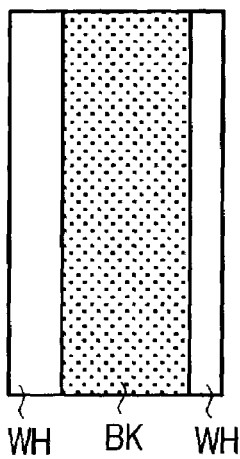
WH  BK  WH
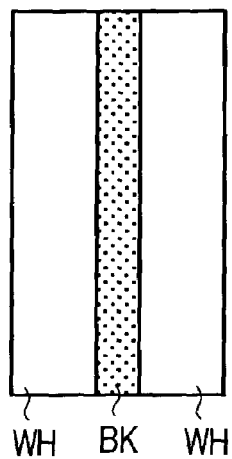
WH  BK  WH

PX1  PAS1

PX1  PAS1

PX1  PAS1

FIG. 23
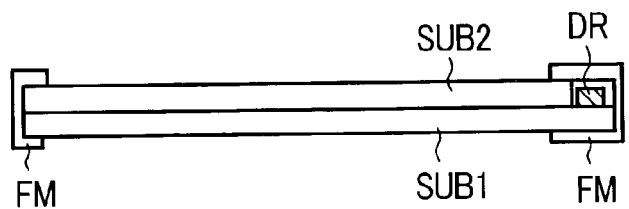
FIG. 24A    FIG. 24B
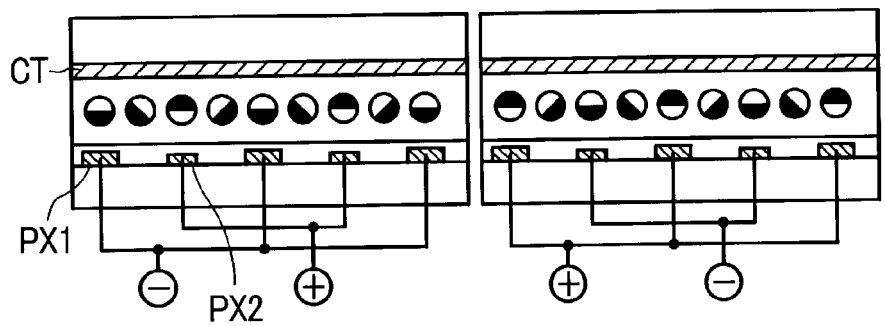
FIG. 25A    FIG. 25B
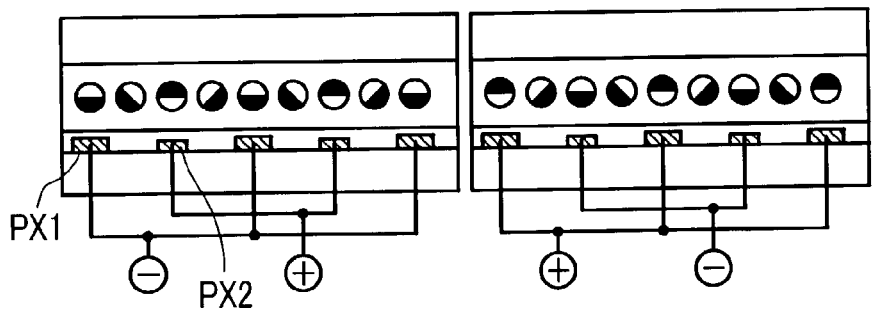
FIG. 26A    FIG. 26B
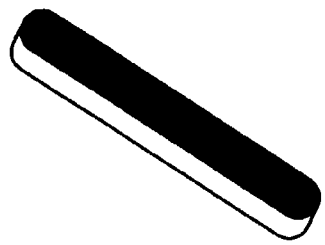

IMAGE DISPLAY DEVICE

BACKGROUND OF THE INVENTION

The present invention relates to an image display device; and, more particularly, the invention relates to an image display device which produces a display by making use of the rotation of electronic balls.

In providing a thin image display device, there has been extensive development of liquid crystal display devices. However, with respect to liquid crystal display devices, there still remains the drawback that it is difficult to hold the same image for a long period of time. Recently, as a novel image display device which can solve this drawback, a system has been proposed in which a display is generated using rotatable electronic balls.

To briefly explain this method, two hemispheres of the same ball are respectively coated in black and white to form a black region and a white region, and static electricity having either a plus polarity or a negative polarity is preliminarily imparted to the black region, for example. Then, this ball is held between electrodes which are formed on upper and lower substrates. In applying an electric field between the upper and lower electrodes, when the intensity of the electric field is less than a threshold value, the black region is directed toward the display side, so that a black display is obtained; while, when the intensity of the electric field is equal to or greater than the threshold value, the ball is rotated and the white region is directed toward the display side, so that a white display is obtained, whereby a black-or-white binary display is produced. The method including electrophoresis can hold the same image for a long time, and, hence, the application of this method to a so-called electronic paper is being developed.

SUMMARY OF THE INVENTION

In the previously mentioned method, which performs display by rotating a ball, the rotation of the ball is determined on the basis of whether the display electric field exceeds a threshold value or not. That is, the method adopts a principle which enables a binary display to be generated. Since the reverse rotation of the ball is performed on the basis of the threshold value, it is possible to hold the ball for a long time. However, there still remains a drawback in that it is difficult to produce a multiple gray scale display using this method.

A technique which realizes a color display, rather than a white/black display, is disclosed in JP-A-2000-194022. However, a technique which makes it possible to produce a multiple gray scale display is not disclosed in this publication. Accordingly, there still remains a problem in that it is difficult to realize a multicolor display of not less than 64 colors, which exceeds the combination of primary colors and requires a gray scale display of each color. The present invention has been made to open a way to solve such a drawback.

Accordingly, it is a first object of the present invention to provide an image display device which can produce a multiple gray scale display, which image display device performs display by making use of the rotation of balls.

It is a second object of the present invention to provide an image display device which produces a display by making use of the rotation of balls and which can realize a multicolor display of not less than 64 colors.

It is a third object of the present invention to provide an image display device which produces a display by making use of the rotation of balls and which can resolve sticking which may occur when the display is performed for a long period of time.

It is a fourth object of the present invention to provide an image display device which produces a display by making use of the rotation of balls and which can enhance reflectance, thus providing a bright image display device.

Although the present invention can achieve all of the above-mentioned various objects, it is needless to say that the present invention may be employed for realizing some of these objects.

An example of the constitutions which can achieve the above-mentioned objects according to the present invention, will be briefly described as follows.

(1) An image display device includes a first substrate and a second substrate, and spherical bodies, which are sandwiched between the first substrate and the second substrate and are rotatable. Each spherical body has at least two regions formed by dividing the spherical body in color. First electrodes are formed on either one of the first substrate and the second substrate and second electrodes are formed on either one of the first substrate and the second substrate, wherein a display is produced by applying the voltage difference between the first electrodes and the second electrodes, so as to selectively rotate said spherical bodies. In this regard, a plurality of regions which differ in the intensity of the electric field applied to the spherical bodies are formed with respect to the voltage difference.

(2) An image display device includes a first substrate and a second substrate, the spherical bodies, which are sandwiched between the first substrate and the second substrate and are rotatable. Each spherical body has at least two regions formed by dividing the spherical body in color. First electrodes and second electrodes are formed on the first substrate, and third electrodes are formed on the second substrate, wherein a voltage difference is imparted between the first electrode, the second electrode and the third electrode so as to selectively rotate said spherical bodies and produce a display.

(3) An image display device includes a first substrate and a second substrate, and spherical bodies, which are sandwiched between the first substrate and the second substrate and are rotatable. Each spherical body has at least two regions formed by dividing the spherical body in color. First electrodes are formed on either one of the first substrate, and the second substrate, and second electrodes are formed on either one of the first substrate and the second substrate, wherein a display is produced by applying the voltage difference at least between the first electrodes and the second electrodes, in such a way that there are plurality of directions of the electric field formed by the voltage difference.

(4) An image display device includes a first substrate and a second substrate, and spherical bodies, which are sandwiched between the first substrate and the second substrate and are rotatable. Each spherical body has at least two regions formed by dividing the spherical body in color. First electrodes are formed on either one of the first substrate and the second substrate and second electrodes are formed on either one of the first substrate and the second substrate, wherein a display is produced by applying the voltage difference at least between the first electrodes and the second electrodes, in such a way that there are a plurality of rotating directions of the spherical bodies.

(5) An image display device includes a first substrate and a second substrate, and spherical bodies, which are sandwiched between the first substrate and the second substrate and are rotatable. Each spherical body has at least two regions formed by dividing the spherical body in color. First electrodes are formed on at least the first substrate and second electrodes are formed on the second substrate, wherein the second electrodes are formed of planar electrodes and the first electrodes are formed of linear electrodes.

(6) In any one of the constitutions (I) to (4), the first electrodes and the second electrodes are formed in a linear shape.

(7) In the constitution (2), the first electrodes and the second electrodes are formed in a linear shape and the third electrodes are formed in a planar shape.

(8) In any one of the constitutions (1) to (7), at least one of the first electrodes and the second electrodes have an L shape.

(9) In either one of the constitutions (6) and (7), the second electrode is sandwiched by two first electrodes, the first electrodes are arranged in parallel to each other, and the second electrode is extended in an oblique direction with respect to the first electrode.

(10) In either one of the constitutions (6) and (7), the second electrode is sandwiched by two first electrodes, the first electrodes are arranged in parallel to each other, the second electrode has a portion which is parallel to the first electrodes and a portion which is not parallel to the first electrodes, and the distance of the parallel portion of the second electrode with respect to the first electrodes has a plurality of values in the extending direction of the first electrodes.

(11) In any one of the constitutions (5) to (7), the linear electrode is arranged at a side remote from a display surface.

(12) In any one of the constitutions (5) to (7), a transparent conductive layer is formed on a front side of the viewer-side substrate.

(13) In any one of the constitutions (5) to (7), a touch panel is formed on a front side of the viewer-side substrate.

(14) In any one of the constitutions (1) to (13), each spherical body has a black region and a white region.

(15) In any one of the constitutions (1) to (13), each spherical body has a black region and a region which is colored in any one of red, green and blue.

(16) In any one of the constitutions (1) to (13), each spherical body has a black region and a region which is colored in any one of cyan, magenta and yellow.

(17) In either one of the constitution (15) and the constitution (16), the colors of the colored regions differ for respective pixels which are arranged close to each other in the lateral direction of the image display device.

(18) An image display device includes a first substrate and a second substrate, and spherical bodies, which are sandwiched between the first substrate and the second substrate and are rotatable. Each spherical body has at least two regions formed by dividing the spherical body in color. First electrodes are formed on either one of the first substrate and the second substrate and second electrodes are formed on either one of the first substrate and the second substrate, wherein the image display device includes a plurality of regions which differ in inter-electrode distance between the first electrode and the second electrode.

(19) An image display device includes a first substrate and a second substrate, and spherical bodies, which are sandwiched between the first substrate and the second substrate and are rotatable. Each spherical body has at least two regions formed by dividing the spherical body in color. First electrodes are formed on the first substrate and second electrodes are formed on the second substrate, wherein a dielectric layer is formed between the first electrodes and the second electrodes. The image display device includes a plurality of regions in which the thickness of the dielectric layer differs.

(20) In the constitution (18), the first electrodes and the second electrodes are formed on the first substrate, and the image display device further includes third electrodes which are formed on the second electrodes.

(21) In either one of the constitution (18) and (20), the second electrodes are arranged such that the second electrode is sandwiched by a plurality of first electrodes, a plurality of first electrodes extend parallel to each other, and the second electrode is arranged obliquely with respect to the first electrodes.

(22) In either one of the constitution (18) and the constitution (20), the second electrodes are arranged such that the second electrode is sandwiched by a plurality of first electrodes, a plurality of first electrodes extend in parallel to each other, and the second electrode has a portion which is parallel to the first electrodes and a portion which is not parallel to the first electrodes. The distance of the parallel portion of the second electrode with respect to the first electrodes has a plurality of values in the extending direction of the first electrodes.

(23) In the constitution (22), assuming a distance between the second electrode and the first electrode which is arranged at the left side of the second electrode as a first distance and a distance between the second electrode and the first electrode which is arranged at the right side of the second electrode as a second distance, a region which has a small difference between the first distance and the second distance has set a length of the portion of the second electrode which is parallel to the first electrodes shorter than a length of the second electrode which is parallel to the first electrodes in a region in which the difference between the first distance and the second distance is large.

(24) In the constitution (18), the first electrodes are formed on the first substrate, the second electrodes are formed on the second substrate, and the image display device includes a plurality of regions which differ in the distance between the first electrode and the second electrode.

(25) In the constitution (24), the first electrodes and the second electrodes have a planar shape.

(26) An image display device includes a first substrate and a second substrate, and spherical bodies, which are sandwiched between the first substrate and the second substrate and are rotatable. Each spherical body has at least two regions formed by dividing the spherical body in color. First electrodes are formed on either one of the first substrate and the second substrate and second electrodes are formed on either one of the first substrate and the second substrate, wherein the rotation of the spherical bodies is controlled based on a voltage applied between the first electrodes and the second electrodes. The image display device includes a plurality of regions which differ in a threshold value voltage which produces rotation of the spherical bodies in the pixels.

(27) In any one of the constitutions (18) to (26), the spherical body has a black region and a white region.

(28) In any one of the constitutions (18) to (26), the spherical body includes a black region and a region which is colored in any one of red, green and blue.

(29) In any one of the constitutions (19) to (26), the spherical body includes a black region and a region which is colored in any one of cyan, magenta and yellow.

(30) In either one of the constitution (28) and the constitution (29), the colors of the colored regions differ for respective pixels which are arranged close to each other in the lateral direction of the image display device.

(31) An image display device includes a first substrate and a second substrate, and spherical bodies, which are sandwiched between the first substrate and the second substrate and are rotatable. Each spherical body has at least two regions formed by dividing the spherical body in color, wherein first electrodes and second electrodes are formed on the first substrate and the polarities of the first electrodes and the second electrodes are periodically changed over.

(32) In the constitution (31), the first electrodes and the second electrodes have a linear shape and the image display device includes third electrodes having a width larger than the width of the first electrodes and the second electrodes on the second substrate.

(33) An image display device includes a first substrate and a second substrate, and spherical bodies, which are sandwiched between the first substrate and the second substrate and are rotatable. Each spherical body has at least two regions formed by dividing the spherical body in color. First electrodes are formed on either one of the first substrate and the second substrate and second electrodes are formed on either one of the first substrate and the second substrate, wherein the spherical bodies have a columnar shape.

BRIEF DESCRIPTION OF THE DRAWINGS

FIGS. 11A to 11E are diagrams of an image display device according to another embodiment of the present invention.

FIGS. 16A to 16C are diagrams of a pixel display of an image display device according to another embodiment of the present invention.

FIGS. 18A to 18C are diagrams of a pixel display of an image display device according to another embodiment of the present invention.

FIG. 23 is a diagram showing an example of an image display device of the present invention.

FIGS. 24A and 24B are diagrams of the driving arrangement of another embodiment of the present invention.

FIGS. 25A and 25B are diagrams of the driving arrangement of another embodiment of the present invention.

FIGS. 26A and 26B are diagrams of a spherical body according to another embodiment of the present invention.

DESCRIPTION OF THE PREFERRED EMBODIMENTS

The technical features of the present invention will be explained hereinafter in conjunction with various embodiments.

Embodiment 1

Figure 1A:
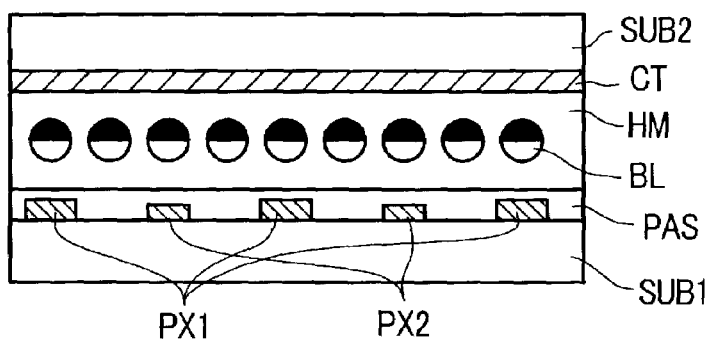
FIGS. 1A to 1C are diagrammatic cross-sectional views of a pixel of an image display device according to one embodiment of the present invention.
Figure 1B:
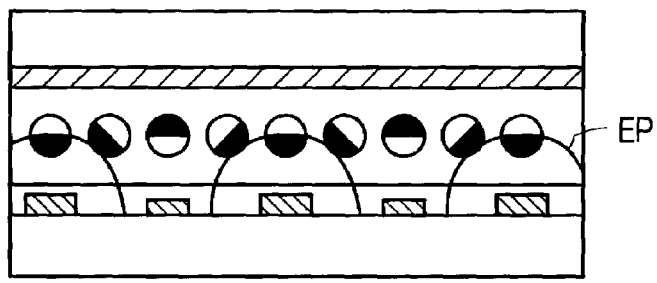
Figure 1C:
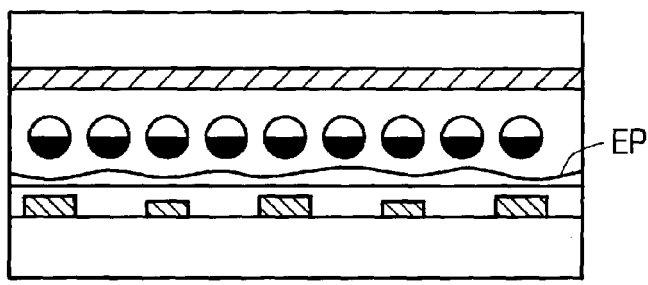

FIGS. 1A to 1C are schematic cross-sectional views of the structure of a pixel according to one embodiment of the present invention. Two types of electrodes PX1 and PX2 are formed on a first substrate SUB1, on which the electrodes PX1 and PX2 are arranged alternately. A protective film PAS is formed over the electrodes PX1, PX2 so as to protect these electrodes. A reference electrode CT is formed on the inner surface of a second substrate SUB2. Spherical bodies (electronic balls) BL are formed between the substrates SUB1, SUB2. Each electronic ball has two regions which differ in luminance, for example, wherein one region is formed as a black region and another region is formed as a white region. These electronic balls BL are supported by a support body HM. To facilitate the manufacture thereof, the electronic balls and the support body may be formed on the second substrate SUB2. In this case, the first substrate SUB1, which has a relatively complicated electrode arrangement, can be manufactured separately, so that the yield rate can be enhanced.

Figure 2A:
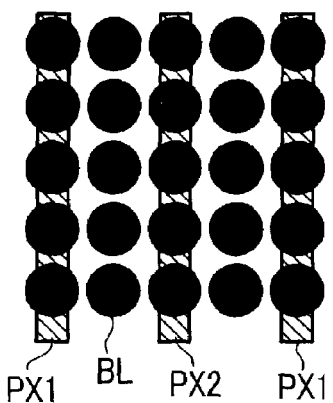
FIGS. 2A to 2C are diagrammatic plan views of a pixel of an image display device according to one embodiment of the present invention.
Figure 2B:
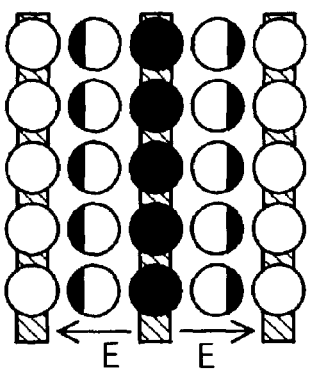
Figure 2C:
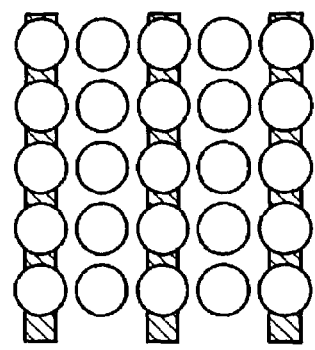

FIGS. 2A to 2C are schematic plan views in which the behavior of the electronic balls BL between the electrode PX1 and the electrode PX2 in FIG. 1 is viewed from the second substrate SUB2 side. The rotational behavior of the electronic balls BL due to the application of a voltage between the electrodes PX1, PX2 and the reference electrode CT will be explained in conjunction with the drawings.

FIG. 1A shows a stationary state. Black portions of the electronic balls BL are directed toward the second substrate SUB2 side. By setting the second substrate SUB2 side to serve as a display screen (surface) side, light incident from the second substrate SUB2 side is absorbed in the black portions of the electronic balls BL, and, hence, the reflectance assumes a low value. Accordingly, the display image as viewed by a viewer becomes dark, and, hence, a black display is obtained. FIG. 2A is a view as seen from the display screen side. It is understood that the electronic balls BL are arranged in rows with the black surfaces thereof directed toward the display screen side. In this manner, a black display is obtained.

FIG. 1B shows a half-tone state. Static electricity is preliminarily charged to hemispheres (semispheres), for example, the black portions, of the electronic balls BL. Here, the static electricity is a plus charge, for example. In such a state, when a plus charge is applied to the reference electrode CT, a repulsive force is generated between the plus charge of the reference electrode CT and the plus charge of the electronic balls BL, so that a rotational force is imparted to the electronic balls BL. When this rotational force exceeds a given threshold value, the electronic balls BL are rotated.

In the conventional method, since the display is performed only on the basis of the presence or non-presence of this rotation, only a binary display is possible, whereby a multiple gray scale display can not be realized. On the contrary, in FIG. 1B, when potentials of 0 V, −20 V, +10 V are respectively applied to the reference electrode CT, the electrode PX1 and the electrode PX2, the electronic balls BL are arranged in rows, as shown in FIG. 1B. The electronic balls BL above the electrode PX1 have the black surfaces thereof directed to the first substrate SUB1 side and the electronic balls BL disposed between the electrodes PX1, PX2 change their directions in accordance with the applied electric field. This is because an equipotential surface, which corresponds to the threshold value, is formed in a semicircular shape which surrounds the electrode PX1, as indicated by a fine line EP in the drawing. Since the equipotential surface can be easily understood from the voltage, the equipotential surface is not shown in the drawing.

FIG. 2B is a view which is obtained by viewing the electronic balls BL in the state shown in FIG. 1B from the display screen side. At the display screen side, the white balls, the black balls and the half-tone balls are present in a mixed state. In an image which is actually viewed by an viewer with the naked eye, these balls are mixed and averaged so that the image is recognized as a half tone. By adjusting the potential difference between the reference electrode CT and the electrodes PX1, PX2, the distance between the equipotential surface and the electrode PX1 is changed. Accordingly, the degree of rotation of the electronic balls BL, that are disposed between the electrode PX1 and the electrode PX2, is changed so that a multiple gray scale display can be realized.

FIG. 1C shows an example in which −20 V is applied to both the electrode PX1 and the electrode PX2. As indicated by the fine line EP in the drawing, the equipotential surface becomes substantially parallel to the electrode PX1 and the electrode PX2. Accordingly, the electronic balls BL are completely rotated. The display image, as shown in FIG. 2C, appears as a white display.

In this manner, according to the present invention, it is possible to realize an image display device using electronic balls which can realize a half-tone display. In resetting the image, by applying −20 V to the reference electrode CT and +20 V to the electrodes PX1, PX2, for example, the black portions of the electronic balls BL face the second substrate SUB2 side so that the image can assume the state shown in FIG. 1A again.

Although this embodiment has been explained in conjunction with an example in which the black portions are charged positively, when the black portions are charged negatively, it is also possible to realize a multiple gray scale display in the same manner by properly setting the potential between the electrodes.

In this manner, according to this embodiment, by controlling the voltages of the electrodes PX1, PX2 or by controlling the difference between voltages of these electrodes PX1, PX2, it is possible to easily realize a multiple gray scale display of not less than 4 gray scales.

Further, by adopting coloring portions and non-coloring portions in place of the black portions and the white portions of the electronic balls BL, it is possible to realize a color display. For example, using red and black, it is possible to realize a red multiple gray scale display. Accordingly, for example, by constructing an image display device which uses electronic balls for display of a plurality of pixels, and by sequentially arranging electronic balls having different colors, for example, three colors, consisting of red, green and blue, for respective pixels arranged close to each other, a color display can be realized. Since it is possible to perform a multiple gray scale display with respect to each color, by producing a multiple gray scale display of not less than 4 gray scales for each color, it is possible to realize a multicolor display of not less than 64 colors, so that an electronic paper, which can replace the display of a newspaper in color, can be realized.

In accordance with the present invention, the term "electronic ball" means a structural object which has regions of at least two colors or two luminances, or more, and is capable of selectively directing either one of these two regions toward the display screen side. Accordingly, it is not always necessary that the electronic ball has a completely spherical shape. In accordance with the present invention, the term "spherical body" means a structural body in which at least a portion of the cross-sectional shape thereof has a curved portion. Further, in accordance with the present invention, the rotation includes a state in which the direction of a structural body changes while moving and a state in which the direction of a structural body changes by moving.

Embodiment 2

FIGS. 3A to 3C and FIGS. 4A to 4C are views which correspond to the views provided in FIGS. 1A to 1C and FIGS. 2A to 2C of the embodiment 1. The feature which makes the embodiment 2 different from the embodiment 1 lies in the fact that the reference electrode CT is not formed on the second substrate SUB2 side.

The reference electrode CT in the embodiment 1 contributes to the stabilization of the potential formed between the electrode PX1 and the electrode PX2. However, even when the reference electrode CT is eliminated, it is possible to realize substantially the same display. In this case, the manufacturing cost of the image display device can be reduced by an amount corresponding to the cost saving relating to the elimination of the reference electrode CT at the second substrate SUB2 side.

Figure 3A:
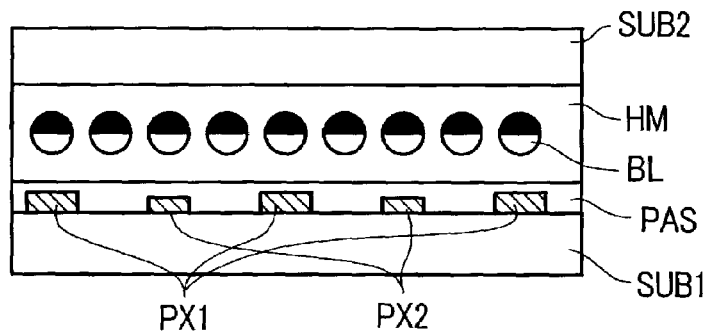
FIGS. 3A to 3C are diagrammatic cross-sectional views of a pixel of an image display device according to another embodiment of the present invention.
Figures 4A, 4B, 4C:
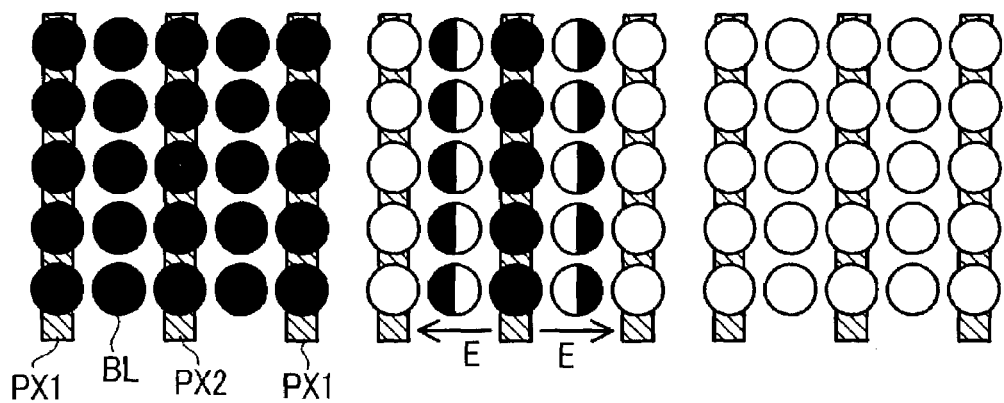
FIGS. 4A to 4C are diagrammatic plan views of a pixel of an image display device according to another embodiment of the present invention.

FIG. 3A shows a state in which the black portions of the electronic balls are charged positively, and +20 V, for example, is applied to the electrodes PX1 and the electrodes PX2. The display appears as a black display, as shown in FIG. 4A.

Figure 3B:
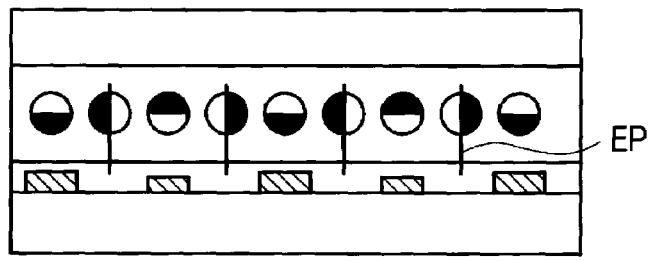

FIG. 3B shows an example in which −20 V is applied to the electrodes PX1 and +20 V is applied to the electrodes PX2. The equipotential surface EP becomes perpendicular to the substrates between the electrode PX1 and the electrode PX2. As a result, the electronic balls BL appear as shown in FIG. 4B, so that a half-tone display can be realized.

Figure 3C:
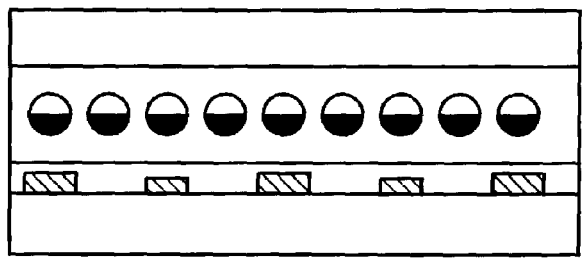

FIG. 3C shows an example in which −20 V is applied to the electrodes PX1 and the electrodes PX2. Since the equipotential surface EP is substantially parallel to the substrate SUB1, the black portions of the electronic balls BL are directed toward the first substrate SUB1 side. The display image, as shown in FIG. 4C, appears as a white display.

In contrast to the case described in conjunction with the embodiment 1, the reference electrode CT is not formed on the second substrate SUB2 side in this embodiment; and, hence, the accuracy of control due to a voltage applied in the half tone state is degraded, so that the number of gray scales which can be displayed is decreased, compared to the corresponding number of gray scales available in the embodiment 1. However, it is possible to produce a multiple gray scale display of not less than 64 gray scales; and, hence, the image display device of this embodiment has a sufficient performance as an electronic paper, in view of the cost reduction effect brought about by the elimination of the reference electrode CT.

However, to cope with the desire for production of a so-called full color display, which requires not less than 16 million colors, the constitution of the embodiment 1 is preferable.

Embodiment 3

In the image display device using electronic balls, both the embodiment 1 and the embodiment 2 exhibit a novel and remarkable effect in that an enlargement of the viewing angle can be realized. This effect will be explained in conjunction with FIGS. 6A to 6H.

Figure 6A:
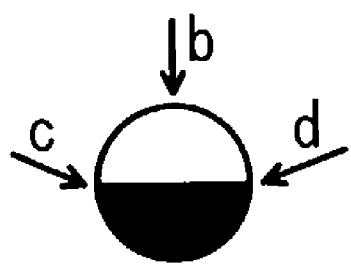
FIGS. 6A to 6H are diagrams of another embodiment of the present invention.
Figure 6E:
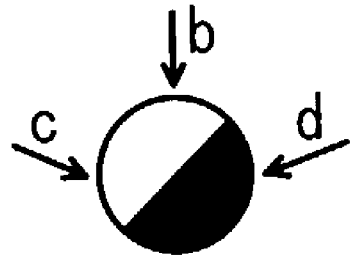
Figure 6B:
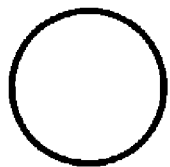
Figure 6F:
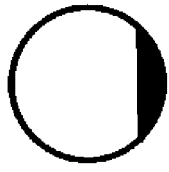
Figure 6C:
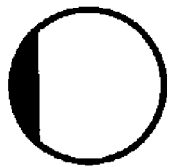
Figure 6G:
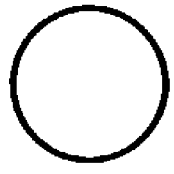
Figure 6D:
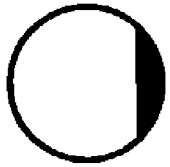
Figure 6H:
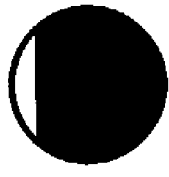

FIGS. 6B, 6C and 6D respectively show how the electronic ball is viewed in the respective directions b, c, d when the electronic ball assumes the state shown in FIG. 6A. In FIG. 6B, in which the electronic ball is viewed from directly above, the electronic ball exhibits a white appearance; while, in FIG. 6C, in which the electronic ball is viewed from the left direction, and in FIG. 6D, in which the electronic ball is viewed from the right direction, a major portion of the electronic ball exhibits a white appearance, although black is slightly mixed in the view. Accordingly, in a black-or-white binary display, there is only a small angle dependency with respect to the difference in luminance or difference in color, so that it is apparent that the problem of the viewing angle is not important.

However, it has been found that this difference in luminance or difference in color causes a great problem in the half-tone state. FIG. 6E shows an example of the electronic ball in the half-tone state. Here, FIGS. 6F, 6G and 6H indicate states which are viewed in the same directions b, c, d as described with reference to FIG. 6A to FIG. 6. In this case, the electronic ball appears to be mainly white and partially black in FIG. 6F; the electronic ball appears white in FIG. 6G; and the electronic ball appears to be mainly black and partially white in FIG. 6H. Accordingly, the tone is changed within a range from black to white depending on the viewing direction, so that the targeted half tone is only obtained in the direction limited to the direction viewed from the front face. The result is that the image display device has a narrow viewing angle.

In view of the above, according to the present invention, with the use of the structure disclosed in the embodiments 1 and 2, for example, the electric field generated between the electrodes is configured to have a plurality of directions. This effect is realized by alternately arranging the linear electrodes. Due to such an arrangement, as shown in FIG. 1B and FIG. 3B, the regions where the white portions are directed toward the right side and the regions where the white portions are directed toward the left side are present in a mixed form. That is, the electronic balls are arranged such that the electronic balls assume the half-tone state, in which the electronic balls are directed in a plurality of opposite directions. As a result, the differences in viewing direction of the electronic balls compensate each other, and, hence, the viewing angle can be broadened. That is, when the image display device is viewed from the direction c in FIG. 6E, that is, from the left direction, as can be clearly understood from the directions of electronic balls shown in FIG. 1B and FIG. 3B, the electronic balls which are viewed from the direction c and the electronic balls which are viewed from the direction d in FIG. 6E are present in a mixed form; and, hence, an actually observed view with the naked eye becomes an image which is obtained by averaging the images shown in FIG. 6G and FIG. 6H, so that a half-tone display is obtained. Due to such a construction, it is possible to realize an image display device using electronic balls in which there is a broad viewing angle even in the half tone state.

Further, as can be clearly understood from FIG. 2B and FIG. 4B, the electronic balls which are arranged in various directions indicative of white, black and half tone, as viewed from a front face, are present in a mixed form, so that the displayed image appears in a half tone. Accordingly, this provides a constitution in which there is an extremely small difference between viewing an image from the front face and viewing an image from an oblique direction, so that it is possible to realize a broadening of the viewing angle.

To cause a plurality of electronic balls to be directed in directions opposite to each other, it is necessary to impart a plurality of rotating directions to the electronic balls by use of an electric field. Further, as indicated by the electric field E in FIG. 2B and FIG. 4B, it is necessary to provide a plurality of directions of the electric field applied to the electronic balls.

Further, as a result which is obtained by making the polarities of two linear electrodes PX1, PX2 different from each other, as shown in FIG. 2B and FIG. 4B, the electronic balls are present in a mixed form, such that the electronic balls above the electrodes PX1 are white and the electronic balls above the electrodes PX2 are black. In this manner, by providing a state in which white and black balls are present in a mixed form, as viewed from the front face in a half tone state, the viewing angle in a half tone state can be further enhanced.

Figure 5A:
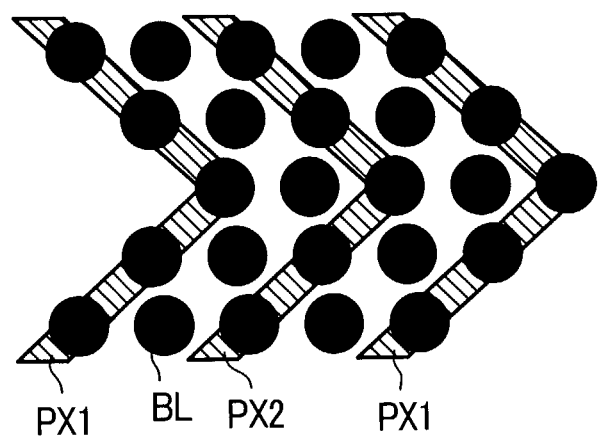
FIGS. 5A to 5C are diagrammatic plan views of a pixel of an image display device according to another embodiment of the present invention.
Figure 5B:
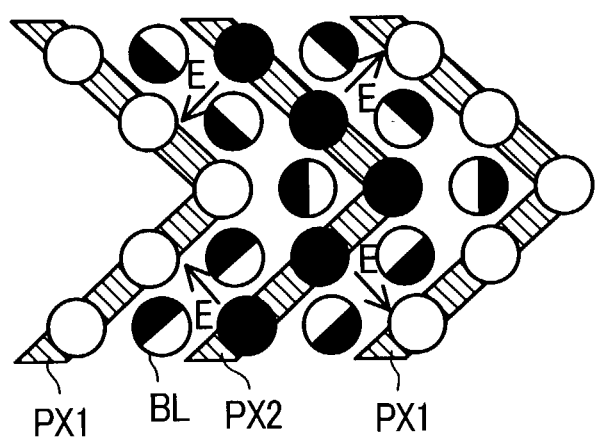
Figure 5C:
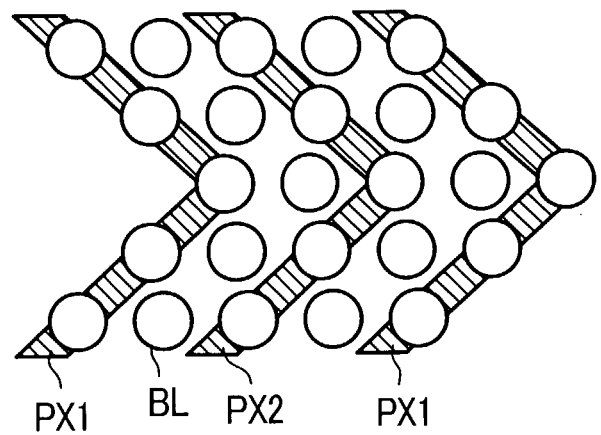

FIGS. 5A to 5C show an example in which the directions of the electric field and the directions of rotation of the balls are increased in number, and they constitute views as seen from the front face, similar to FIGS. 2A to 2C and FIGS. 4A to 4C. The electrodes PX1, PX2 extend in parallel to each other, and they are formed in an L shape or a shape bent like an arrow head.

FIG. 5A shows a state in which +20 V is applied to the electrodes PX1, PX2. Since a plus charge is applied to the black portions of the electronic balls, the black portions of the electronic balls are directed to the reverse-electrode side, that is, the front face side, thus providing a black display.

FIG. 5B shows a state in which −20 V is applied to the linear electrode PX1 and +20 V is applied to the linear electrode PX2, thus providing a half tone state. The electronic balls above the linear electrodes PX1 appear white, the electronic balls above the linear electrode PX2 appear black, and the intermediate electronic balls between the linear electrodes PX1, PX2 appear white and black in halves, respectively. The feature shown in FIG. 5B is that, since the electrodes are bent, the directions E of the electric field generated between the electrodes are further distributed in multiple directions. Accordingly, the electronic balls having a black portion and a white portion appearing in halves are provided with a large number of regions, including regions where the white portion is directed in various directions, including the upward right oblique direction, the right direction, the downward right oblique direction, the downward left oblique direction, the left direction and the upward left oblique direction. As a result, the viewing of the electronic balls in respective directions in a half-tone state can be further averaged, so that a further broadening of a viewing angle can be realized.

FIG. 5C shows a state in which −20V is applied to the electrodes PX1, PX2, and the electronic balls appear as a white display.

As has been explained, the image display devices according to the embodiment 1 and the embodiment 2 can also achieve a viewing-angle broadening effect. Further, as shown in FIGS. 5A to 5C, by provision of electrodes which have an L shape or similar shape, a further improvement of the viewing angle can be achieved.

Example 4

Figure 7:
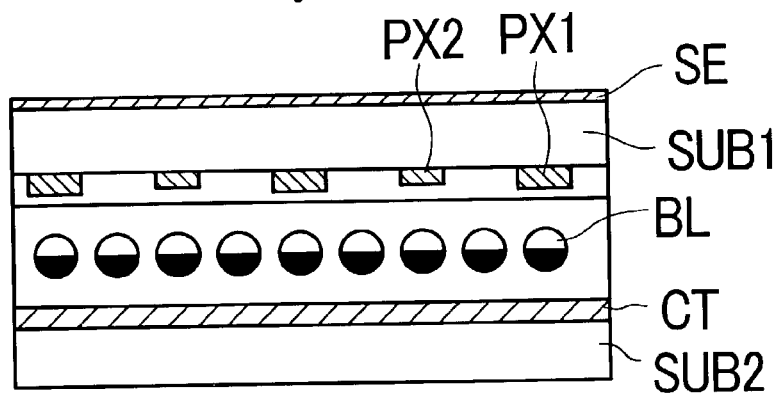
FIG. 7 is a diagrammatic cross-sectional view of a pixel of an image display device according to another embodiment of the present Invention.

FIG. 7 shows a structural arrangement in which a shield electrode SE is formed on a back surface of the substrate SUB1 on which fine-line electrodes are formed. To ensure that the electrode SE has a light transmitting property, it is formed of a transparent conductive body. In the image display device using electronic balls, a countermeasure to cope with static electricity is important. This is because of the fact that it is not a rare case that static electricity assumes a high potential which exceeds 10,000V. When such a high voltage is applied to the image display device, the voltage influences the static electricity, which is preliminarily applied to the electronic balls. When the insulation resistance is infinite, a leaking of these charges does not occur. However, in an actual image display device, it is impossible to obtain an infinite insulation resistance; and, hence, the quantity of static electricity on the electronic balls is changed due to such applied static electricity. As a result, the quantity of static electricity on the electronic balls is subject to an irreversible change. Accordingly, even after the external static electricity is removed, the value of the static electricity which remains on the electronic balls assumes a value different from the previous value; and hence, the rotational threshold value of the electronic balls tends to deviate. This prevents the image display device from producing a normal display and implies that the image display device is no longer operative as a display device. Accordingly, in the image display device using electronic balls, the provision of a countermeasure to cope with the static electricity is extremely important.

By providing the shield electrode SE shown in FIG. 7, it is possible to prevent the external static electricity from influencing the electronic balls. Accordingly, it is possible to prevent mis-operation of the image display device caused by the static electricity.

Figure 8:
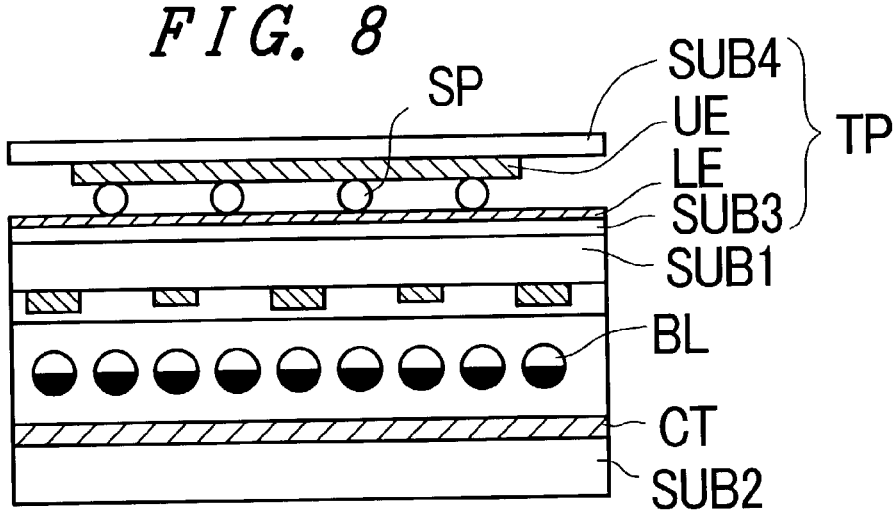
FIG. 8 is diagrammatic a cross-sectional view of a pixel of an image display device according to another embodiment of the present invention.

FIG. 8 shows an example in which a touch panel is used in place of the shield electrode SE. To adopt the image display device using electronic balls as an electronic paper, it is necessary for the image display device to have an information inputting function. Here, by providing the touch panel to the display surface side of the device, it is possible to write in the same manner as a conventional paper. The constitution of the touch panel per se has been well known, and any constitution can be used. One example is shown in FIG. 8. A touch panel TP is configured such that, between a lower substrate SUB3 and an upper substrate SUB4, a lower electrode LE and an upper electrode UE are arranged to face each other in an opposed manner while being separated by way of spacers SP. Here, to ensure the light transmissivity, the lower electrode LE and the upper electrode UE are formed of a transparent conductive body. These electrodes provide a similar function as that of the shield electrode SE in FIG. 7.

When a manipulator pushes a touch panel from a surface of the upper substrate SUB4, the lower electrode LE and the upper electrode UE are brought into contact with each other, and they become conductive with each other. Since the upper electrode UE and the lower electrode LE are constituted in a matrix array, the positions of the crossing points are detected by an external circuit (not shown in the drawing) and positional information is specified. By feeding back the information to the image display device so as to change the display state of the electronic balls, it is possible to make the image display device produce a display in accordance with information inputted from the screen, whereby it is possible to provide an electronic paper having the same function as a conventional paper.

Figure 9:
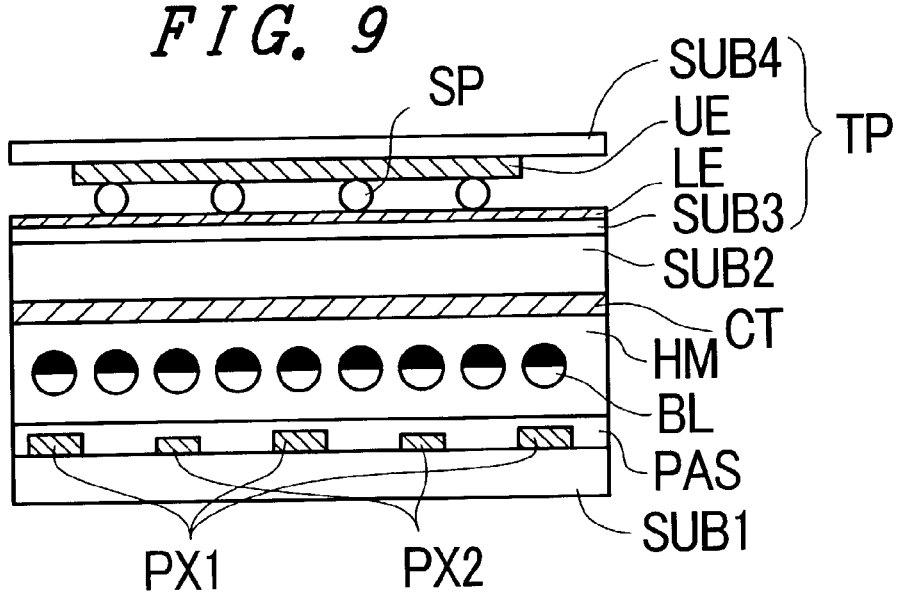
FIG. 9 is a diagrammatic cross-sectional view of a pixel of an image display device according to another embodiment of the present invention.

FIG. 9 shows an example in which the touch panel TP shown in FIG. 8 is formed on the substrate SUB2 side, on which the electrodes are formed in a wide range or in a planar shape. Also, with such a constitution, it is possible to enhance the reliability of the image display device by shielding the static electricity using the touch panel.

The static electricity shielding technique using the shield electrode SE or the touch panel TP, which has been described in conjunction with FIG. 7 to FIG. 9, is applicable to an image display device using electronic balls in general, and, hence, it is applicable to the respective embodiments disclosed in the present application. Further, this embodiment provides the concept of applying the shielding of static electricity to an image display device using electronic balls, so as to realize an enhancement of the reliability of the image display device.

Embodiment 4

Figure 10:
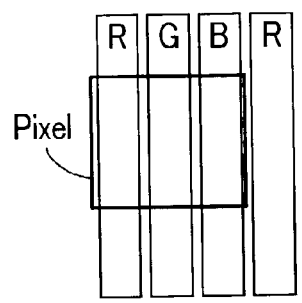
FIG. 10 is a diagram of the arrangement of a pixel of an image display device according to another embodiment of the present invention.

An embodiment which is capable of producing a color display in an image display device using electronic balls, such as the above-disclosed embodiments of the present will be described in conjunction with FIG. 10. The image display device includes a group of pixels which are constituted in a matrix array. Among the group of pixels in a matrix array, for every group of pixels which are arranged close to each other in the lateral direction, the colors of the respective regions of the electronic balls are different from each other. For example, the electronic balls having coloring regions of red (R), green (G) and blue (B) are respectively arranged as shown in FIG. 10. In this example, the electronic ball has two regions, one region is colored with one of these colors and the other region is colored with black. A display pixel is constituted using three pixels arranged close to each other in the lateral direction as a unit. The above-mentioned red, green and blue colors constitute a combination of the so-called three primary colors. Here, it is also possible to adopt a combination of cyan, magenta and yellow which constitute so-called complementary colors.

Further, with respect to the arrangement of the electronic balls having the same color, respective pixels which are arranged close to each other in the longitudinal direction may be formed independently from each other. Further, with respect to the pixels which are arranged close to each other in the longitudinal direction, their arrangement regions may be integrally formed as shown in FIG. 10. In this case, the manufacturing steps can be simplified.

Embodiment 5

FIGS. 11A to 11E illustrates the manner of supporting the electronic balls BL in the image display devices of the respective embodiments of the present invention.

Figure 11A:
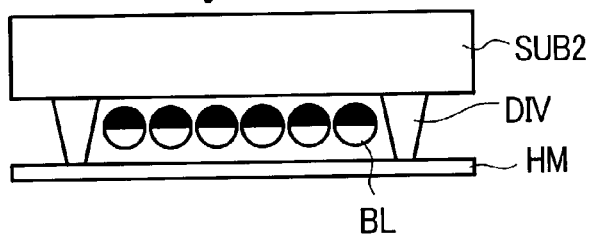

FIG. 11A shows a constitution in which the electronic balls BL are filled in a space defined by an upper substrate SUB2 and separators DIV, and a support body HM is disposed below the electronic balls BL. By arranging the separators DIV between the pixels, for example, it is possible to more clearly identify the electronic balls BL arranged for every pixel. Such a technique can preferably used to made it possible to prevent mixing of colors when electronic balls BL having different colors are arranged for respective pixels. The support body HM is adhered to the separators DIV so that the electronic balls BL are sandwiched by the support body HM, the separators DIV and the substrate SUB2.

Figure 11B:
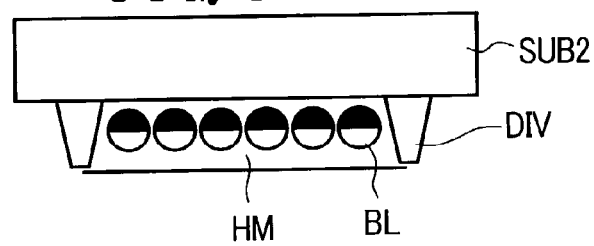

FIG. 11B shows an example in which the electronic balls BL are arranged inside of the support body HM. A resin polymer or a foamed resin in a network form, a porous medium or the like is applicable as an example of a material of the support body HM. As a manufacturing method, the electronic balls BL may be introduced after forming the support body HM, or a mixture of the support body HM and the electronic balls BL may be formed. Further, provided that the accuracy in formation of the support body per se is high, it is possible to omit the separators DIV.

Figure 11C:
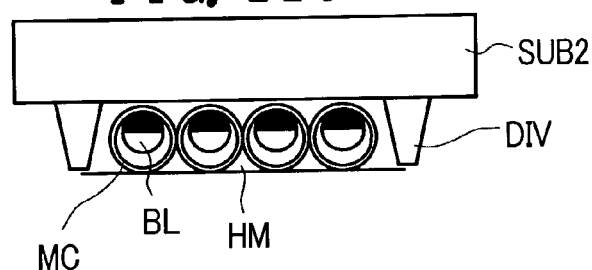
Figure 11C:
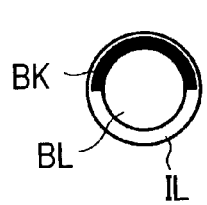
Figure 11C:
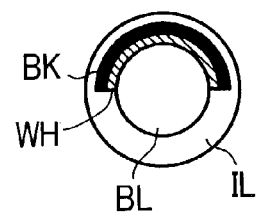

FIG. 11C shows an example in which electronic balls BL are formed inside of micro capsules MC. Since the electronic balls BL are separated from the support body HM by means of the micro capsules MC, it is possible to integrally form the electronic balls BL with the support body HM more easily. The electronic balls BL are rotated or moved within the micro capsules MC so as to change their directions of orientation. Further, since the electronic balls are separated from the support body HM by means of the micro capsules MC, this technique is preferably applicable to an embodiment which provides electrophoresis in place of the electronic balls BL.

FIG. 11D shows an example of the configuration of the electronic ball BL. This drawing is a schematic cross-sectional view. A region which corresponds to a hemisphere of the electronic ball constitutes a colored region BK. Here, it is assumed that the electronic ball BL per se is white or has a light scattering property, so that a white-or-black display can be realized by the rotation of the electronic balls BL. By coloring the BK region such that the electronic ball BL is colored or the electronic ball BL is blackened, a color display can be realized by selective rotation of the electronic balls BL. Further, by constituting the BK region using a conductive material, or by constituting a conductive layer such that the conductive layer is positioned at the BK region, and by covering the whole ball including the BK region with an insulating body IL, it is possible to make the hemisphere of the electronic ball BL selectively hold static electricity.

FIG. 11E shows another example of the configuration of the electronic ball. The main difference between this example and the example shown in FIG. 11D lies in the fact that a black display layer BK is formed on a white display layer WH. Further, in this example, it is preferable that the BL portion of the electronic ball is transparent. With such a constitution, when the electronic ball is directed upwardly, as shown in the drawing, a black display is obtained, while when the electronic ball BL is rotated, light passes through the inside of the electronic ball BL and is reflected on the white display layer WH. In this case, the reflected light is viewed by a viewer, and, hence, a white display is obtained. When the WH portion is colored, a color display is realized in the same manner. Further, when the display layer WH is formed of a conductive layer, assuming that the black display layer BK is an insulation layer, the layer BK can also perform the role of the body IL. Further, the arrangement of the Black display layer BK and the white display layer WH can be reversed. In this case, when the black display layer BK is formed of a conductive layer, the white display layer WH also performs the role of the body IL.

In this embodiment, typical examples of the constitution for supporting the electronic balls BL of the present invention and the constitution of the electronic balls BL which are applicable to the respective embodiments of the present invention, have been disclosed. It is needless to say that this embodiment is not limited to the disclosed examples. Further, even when only the constitution of this embodiment is used without being combined with other embodiments, this embodiment can achieve an advantageous effect attributed to the features of the invention.

Embodiment 6

Figure 12A:
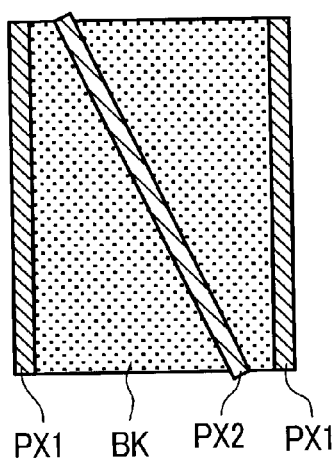
FIGS. 12A to 12C are diagrams of a pixel display of an image display device according to another embodiment of the present invention.
Figure 12B:
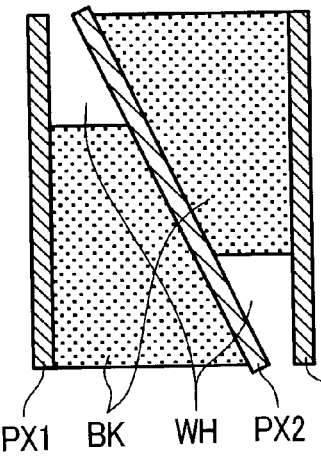
Figure 12C:
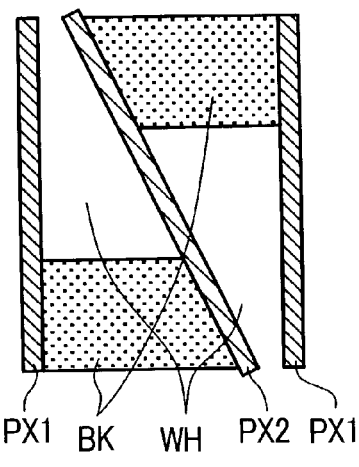

FIGS. 12A to 12C show another example of the present invention which it is possible to realize a halftone display. These views showing the pixel portion as seen in plan view. This embodiment is suitable for an image display using electronic balls and also is suitable for an electrophoresis display device.

An electrode PX2 is constituted such that the electrode PX2 extends in an oblique direction between linear electrodes PX1. With such a constitution, it is possible to form a plurality of regions which differ in the distance between the electrodes PX1 and PX2. In the constitution shown in FIG. 12A, the electrode PX2 is a straight line, and, hence, the distance continuously changes. This implies that when a potential difference is applied between the electrodes PX1 and PX2, since the distance between the electrodes PX1 and PX2 differs in every region, the intensity of an electric field differs in every region. By making use of this phenomenon, while setting a threshold value voltage of the electronic ball or the electrophoresis body per se at the same level, it is possible to provide a threshold value which differs in every region. Due to such a constitution, a half-tone display with high accuracy can be realized.

Figure 20:
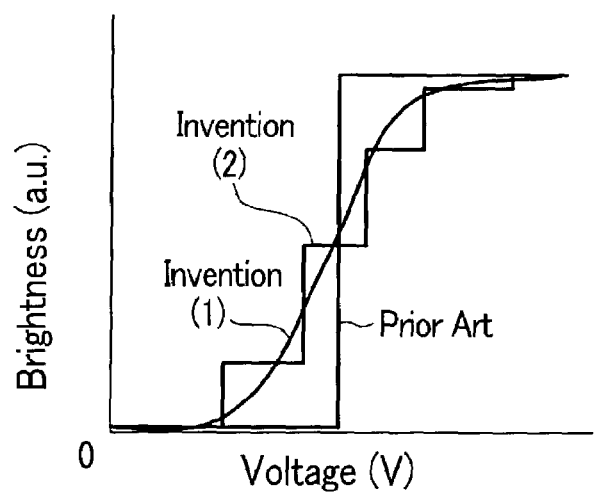
FIG. 20 is a graph showing features of the present invention.

FIG. 20 shows a result in which a half-tone display is realized by providing a threshold value voltage which differs for every region. The voltage is taken on the axis of abscissas and the relative luminance is taken on the axis of ordinates. In a conventional example, it is only possible to realize a binary display in which the electronic balls assume the black state when the voltage is below the threshold value voltage and in which they assume the white state when the voltage is equal to or greater than the threshold value voltage. On the contrary, it is possible to change the threshold value voltage for every region by changing the intensity of the electric field for every region. This is due to the fact that, since the distance differs for every region, the voltage value which produces the threshold-value electric field differs for every region. In other words, this implies a constitution in which the intensity of the electric field applied to the electronic balls changes for every region.

In FIG. 20, a continuous characteristic is shown as the present invention (1) and display in half tone can be produced with high accuracy based on this operation. The advantage of this concept lies in the fact that, in spite of the fact that the electronic balls or the electrophoresis body per se adopts the threshold value of the binary system, a multi-valued display can be realized based on the region control. Accordingly, it is possible to produce a multi-valued display only by suitable arrangement of the pixel pattern, and, hence, the design and the manufacture of the image display device can be realized easily. Further, compared to a case in which the threshold value of the electronic balls exhibit multi-values, it is possible to obtain a multiple gray scale display.

The manner of producing a gray scale display will be explained in conjunction with FIGS. 12A to 12C, which are views as seen from the display surface side, wherein BK is a region in a black state and WH indicates a region in a white state. Respective electronic balls are omitted, and the manner of producing a gray scale will be explained with respect to the regions.

FIG. 12A shows a black state in which the electrodes PX1 and PX2 are supplied with +20V. The whole region between the electrodes PX1 and PX2 constitutes a black region BK.

FIG. 12B shows a dark half tone. This is a state in which −10V is applied to the electrodes PX1 and 0V is applied to the electrode PX2. With respect to an electric field E which is directed from the electrode PX2 to the electrodes PX1, the electric field intensity is strong in the region where the distance between electrodes is short, while the electric field intensity is weak in the region where the distance between electrodes is long. In the region where the distance between electrodes is short, the electric field intensity exceeds the threshold value of the electronic balls, and, hence, the electronic balls are inverted thus exhibiting the white display WH.

FIG. 12C shows a bright half tone. This is a state in which −20V is applied to the electrodes PX1 and 0V is applied to the electrode PX2. With respect to an electric field E which is directed from the electrode PX2 to the electrodes PX1, the electric field intensity is strong in the region where the distance between electrodes is short, while the electric field intensity is weak in the region where the distance between electrodes is long. In the region where the distance between the electrodes is short, the electric field intensity exceeds the threshold value of the electronic balls, and, hence, the electronic balls are reversely rotated, thus exhibiting a white display WH. Since the voltage difference of the electrodes PX1 and PX2 is increased in FIG. 12C compared to the case shown in FIG. 12B, the region where the electric field exceeds the threshold value is enlarged in FIG. 12C compared to the case shown in FIG. 12B, so that a bright half tone is obtained.

In this manner, the control of the half tone can be easily realized by performing region control, whereby a multiple gray scale display can be realized.

Embodiment 7

Figure 13A:
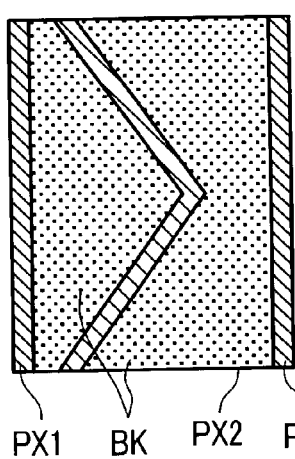
FIGS. 13A to 13C are diagrams of a pixel display of an image display device according to another embodiment of the present invention.
Figure 13B:
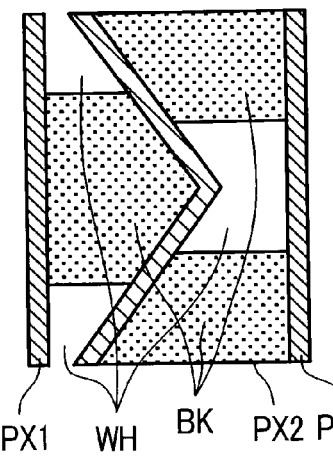
Figure 13C:
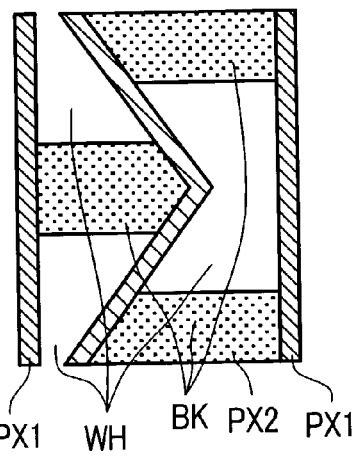

This embodiment embodies the same technical concept as that of the embodiment 6. As shown in FIGS. 13A to 13C, the electrode PX2, which is formed between two electrodes PX1, is bent in an L shape or arrow head shape. That is, the electrode PX2 is formed such that the distance between the electrodes PX1 and PX2 differs for every region. In the same manner as the embodiment 6, when the voltage difference between the electrodes PX1 and PX2 is increased from the black display shown in FIG. 13A, the black display region is gradually inverted into the white display WH starting from the region where the distance is short, so that the dark half tone state shown in FIG. 13B is obtained. When the voltage difference is further increased, the bright half-tone state shown in FIG. 13C is obtained.

Although the WH region is constituted of two regions in the example shown in FIGS. 12A to 12C, the WH region is constituted of three regions in the example shown in FIGS. 13A to 13C. Accordingly, this embodiment can enhance the uniformity of luminance inside of the pixel, and, hence, a more uniform display can be obtained at the time of viewing with naked eye. Particularly, an enhancement of the uniformity of the luminance can be obtained in an image display device which uses electronic balls having low threshold value and in which the distance between the electrodes is largely increased. Further, in the example shown in FIGS. 13A to 13C, in the same manner as the above-mentioned embodiment, the viewing angle enlarging effect in the half tone state can be further enhanced.

Embodiment 8

Figure 14A:
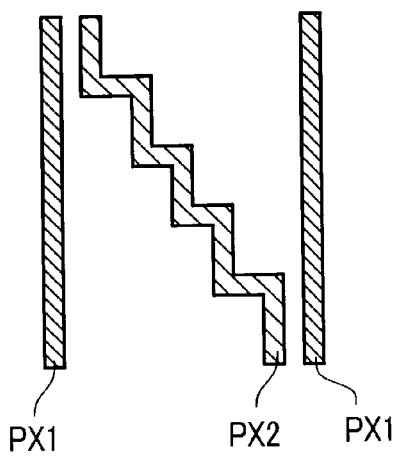
FIGS. 14A and 14B are diagrammatic views of a pixel of an image display device according to another embodiment of the present invention.

This embodiment is another example which embodies the concept which is employed to realize a half tone display in the embodiment 6. As shown in FIG. 14A, the electrode PX2, which is bent in a serpentine shape, is formed between two electrodes PX1. That is, the electrode PX2 is formed between two electrodes PX1 which extend in parallel, wherein the electrode PX2 is constituted of regions which are parallel to the electrode PX1 and regions which are not parallel to the electrode PX1. Due to such a constitution, the distance between electrodes as defined between the electrodes PX1 and PX2 can assume a plurality of discontinuous values. In this constitution, the voltages which constitute the threshold values for respective regions assume values separated from each other, and, hence, the luminance is changed in a digital manner with respect to the voltage difference applied to the electrodes PX1 and PX2.

One example of the embodiment is shown in FIG. 20 as the present invention (2). Accordingly, even when the threshold value of the electronic balls is fluctuated more or less, the characteristics of the luminance with respect to the voltage between electrodes is not influenced by the fluctuation of the threshold value, and, hence, the irregularities among products attributed to the irregularities of the threshold values of the electronic balls can be completely expelled. The constitution which expels the irregularities, while performing a half tone display, by setting the distance between the electrodes in a discrete manner, includes all constitutions to which this concept is applicable. Accordingly, even when the electrodes PX1 and PX2 are constituted as planer electrodes, or the electrodes PX1 and PX2 are respectively arranged on separate substrates which face each other in an opposed manner, and the distance between the electrodes PX1 and PX2 is set in a discrete manner, it is possible to obtain a similar advantageous effect.

Figure 14B:
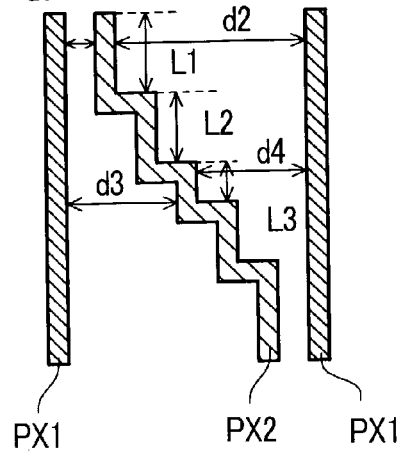

FIG. 14B shows an example which relates to the arrangement of parallel portions of the electrode PX2 with respect to the electrodes PX1. The electrodes PX1 are arranged at both sides, that is, at the left side and the right side of the electrode PX2. Assuming that the distances d1, d2, d3, d4, L1, L2, L3 are as shown in FIG. 14B, the relationship among them are set as d2>>d3, d4>>d1. In the region of the electrode PX2 which establishes the distances d1 and d2, the difference between the left and right distances defined between the electrode PX2 and the left and right electrodes PX1 is increased. The length of the electrode PX2 in this region is set to L1. On the contrary, in the region of the electrode PX2 which establishes the distances d3 and d4, the difference between the left and right distances defined between the electrode PX2 and the left and right electrodes PX1 is decreased. The length of the electrode 2×2 in this region is set to L3. Here, the relationship between the lengths L1 and L3 is set as L1>L3. With such an arrangement, it is possible to further approximate the voltage-luminance characteristics indicated in FIG. 20 as the present invention (2) to the smooth curve indicated as the present invention (1).

Embodiment 9

With respect to the electrodes PX1 and PX2 described in the embodiments 6 to 8, various types of arrangement of these electrodes can be considered. For example, the electrodes PX1 and PX2 may be formed on the substrate SUB1. It may be possible to form the electrodes PX1 on the substrate SUB? and the electrode PX2 on the substrate SUB2. Further, while forming the electrodes PX1 and PX2 on the substrate SUB1, the planar reference electrodes CT may be formed on the substrate SUB2. So long as the technical concept disclosed in the description of embodiments 6 to 8 is applied, various types of constitutions can be considered.

Embodiment 10

Figure 15A:
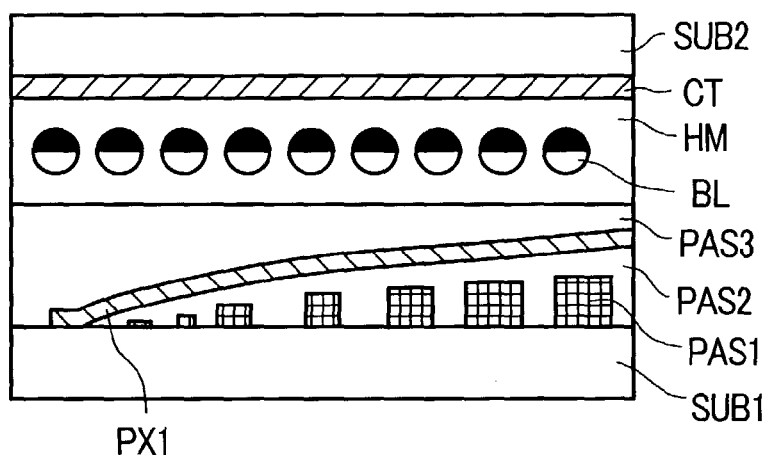
FIGS. 15A to 15C are diagrammatic is a cross-sectional views of a pixel of an image display device according to another embodiment of the present invention.
Figure 15B:
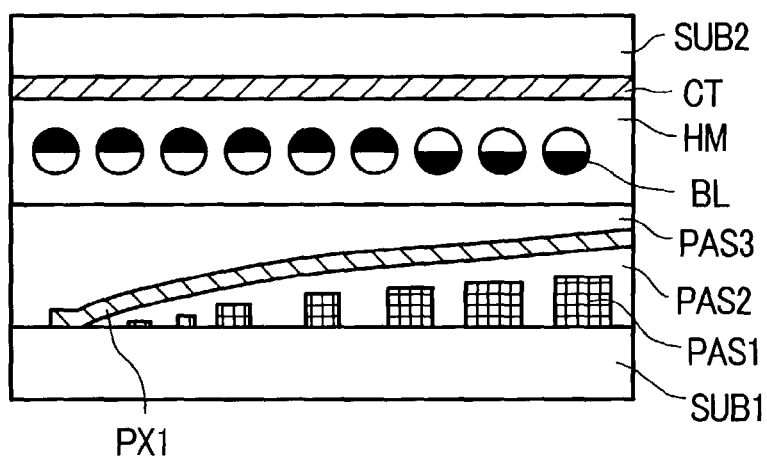
Figure 15C:
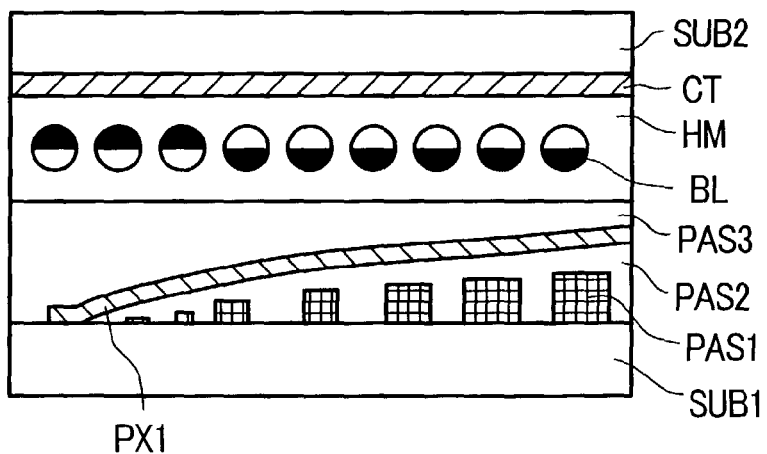

This embodiment represents another example which embodies the concept for realizing a half tone display as employed in the embodiment 6. FIGS. 15A to 15C are cross-sectional views of a pixel, and FIGS. 16A to 16C show the type of display, as viewed from a front face, that is obtained in the examples corresponding to FIGS. 15A to 15C. In the example of FIG. 15A, the pixel includes an electrode PX1 which is formed on the substrate SUB1 and the reference electrode CT which is formed on the substrate SUB2. Here, the distance between the electrode PX1 and the electrode PX2 is set such that the distance differs for every region. In FIG. 15A, the distance between the electrode PX1 and the electrode PX2 is changed for every region by giving an inclination to the electrode PX1. An example of how the inclination is given to the electrode PX1 will be explained.

After applying the protective film PAS1 by coating, the protective film PAS1 is exposed in a spaced-apart manner and with progressive change in the size thereof. By etching the protective film PAS1, the protective film PAS1 is formed of protrusions in which the size or the height thereof is gradually reduced, as shown in FIG. 15A. When the protective film PAS2 made of organic material is formed on the protective film PAS1, a thickness of coating is changed in response to the steps in the background film PAS1, and, hence, the electrode PX1 assumes an inclined shape, as shown in the drawing.

It is needless to say that it is possible to change the film thickness for every region by other techniques, for example, by changing the hardness for every region, such as by changing the quantity of exposure applied to the protective film PAS2, without employing the protective film PAS1, for example. Further, it is possible to use a substrate which preliminarily has an inclined portion. Still further, in forming the substrate SUB1 using plastic or resin, the inclined portion may be formed by changing the film thickness of the substrate per se with a press work. Further, a resin may be printed by a printing method such that the resin is inclined. Since these methods can be easily understood, a detailed explanation of the methods will not be described here.

An example in which the black portions of the electronic balls BL are charged positively will be explained. In FIG. 15A, the black surfaces of the electronic balls BL are directed toward the substrate SUB 2 side so that the display appears as a black display, as shown in FIG. 16A. As an example, this state is a state in which 0V is applied to the reference electrode CT and +20V is applied to the electrode PX1.

FIG. 15B shows a dark half tone state. For example, when 0V is applied to the reference electrode CT and −10V is applied to the electrode PX1, the intensity of electric field exceeds the threshold value in the region where the distance between the electrode PX1 and the reference electrode CT is narrow, and, hence, the electronic balls BL are rotated. Accordingly, as shown in FIG. 16B, the right side which corresponds to the narrow distance portion partially assumes a white state. As seen by the naked eye, this state is recognized as one in which the black portion and the white portion are averaged, and, hence, a dark half tone image is obtained.

FIG. 15C shows a bright half tone state. For example, when 0V is applied to the reference electrode CT and −15V is applied to the electrode PX1, the region where the intensity of electric field exceeds the threshold value is further expanded compared to the case shown in FIG. 15B. As a result, as shown in FIG. 16C, the white display region is further enlarged so that a bright half tone image is obtained. When the potential difference between the reference electrode and the electrode PX is enlarged, an overall white state is obtained.

Also, with the use of the constitution of this embodiment, it is possible to obtain a half tone display having multiple gray scales. Further, fine electrodes are not necessary, and planar electrodes can be used; and, hence, there arises an advantageous effect in that the image display device is hardly influenced by the irregularities of working accuracy, whereby an enhancement of the manufacturing throughput can be realized.

Embodiment 11

This embodiment represents another example which embodies the concept for realizing a half tone display as employed in the embodiment 6. FIGS. 17A to 17C and FIGS. 18A to 18C respectively correspond to FIGS. 15A to 15C and FIGS. 16A to 16C in the embodiment 10. In this embodiment, the electrode PX1 is formed parallel to the substrate SUB1 and a dielectric layer PAS1 is formed on the electrode PX1. The dielectric layer PAS1 has the dielectric constant ∈. When the value of the dielectric constant ∈ differs between the dielectric layer PAS1 and regions other than the dielectric layer PAS1, it is possible to make the effective electrical distance between the electrode PX1 and the reference electrode CT different between the PAS1 forming portion and the PAS1 non-forming portion. Accordingly, although the physical distance between electrode PX1 and the reference electrode CT is equal for every region, a constitution which can change the effective electrical distance between the electrode PX1 and the reference electrode CT for every region can be obtained.

As one example, there is provided a case in which the dielectric layer PAS1 is formed of an organic material having the low dielectric constant, preferably a dielectric constant of not more than 5, and the gaps defined at both sides of the dielectric layer PAS1 are filled with a material having a dielectric constant which is higher than that of the dielectric layer PAS1. In this case, due to the law of electromagnetism, in the electronic ball forming region, which is a region corresponding to the PAS1 forming region, the intensity of the electric field becomes weak compared to the region which corresponds to the PAS1 non-forming region. In other words, it can be said that the effective electrical distance between the electrode PX1 and the reference electrode CT is increased in the PAS1 forming region. This embodiment realizes produces a half tone display by making use of this phenomenon.

Figure 17A:
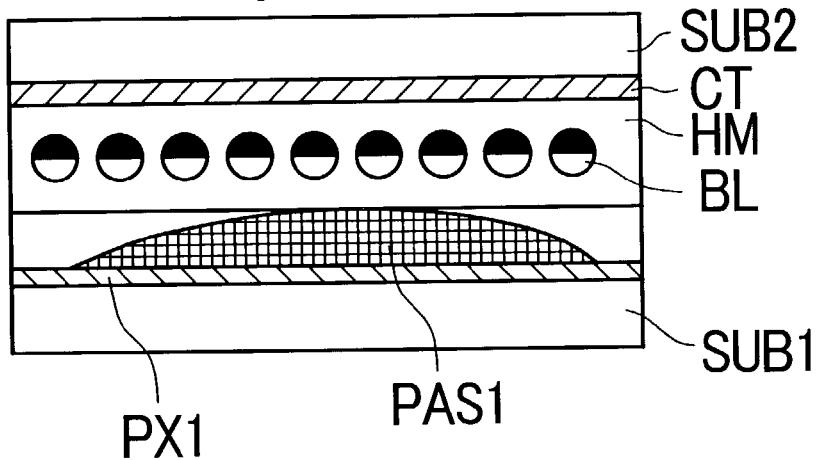
FIGS. 17A to 17C are diagrammatic cross-sectional views of a pixel of an image display device according to another embodiment of the present invention.

FIG. 17A and FIG. 18A show the black display state. In this state, as one example, the black portions of the electronic balls BL are charged positively, 0V is applied to the reference electrode CT and +20V is applied to the electrode PX1.

Figure 17B:
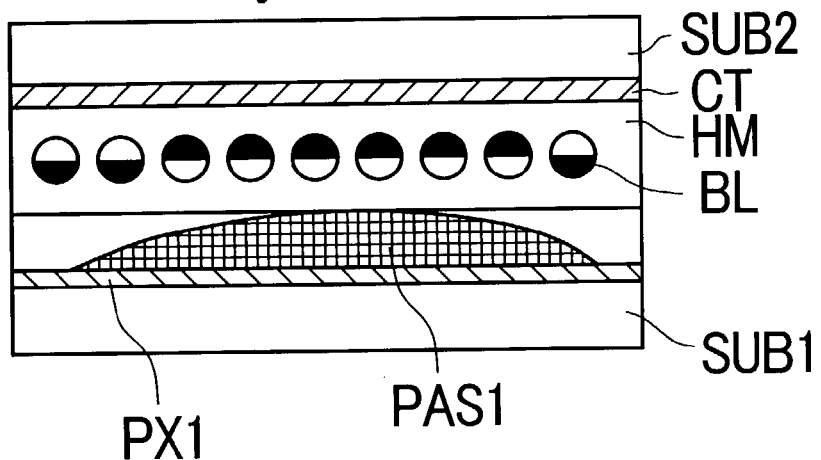

FIG. 17B and FIG. 18B show the dark half tone state. In this state, as one example, −10V is applied to electrode PX1 and 0V is applied to the reference electrode CT. In the PAS1 forming region, the intensity of the electric field is low and the thicker the film thickness of the dielectric layer PAS1, the more the intensity of the electric field in such a region will be decreased. Accordingly, in this state, the intensity of the electric field exceeds the threshold value voltage only in the region where the film thickness of the dielectric layer PAS1 is thin, and so the electronic balls BL are rotated in this region. The display assumes a display state shown in FIG. 18B, in which regions which correspond to both sides of the dielectric layer PAS1 appear as white regions WH, so that a dark half tone image is obtained.

Figure 17C:
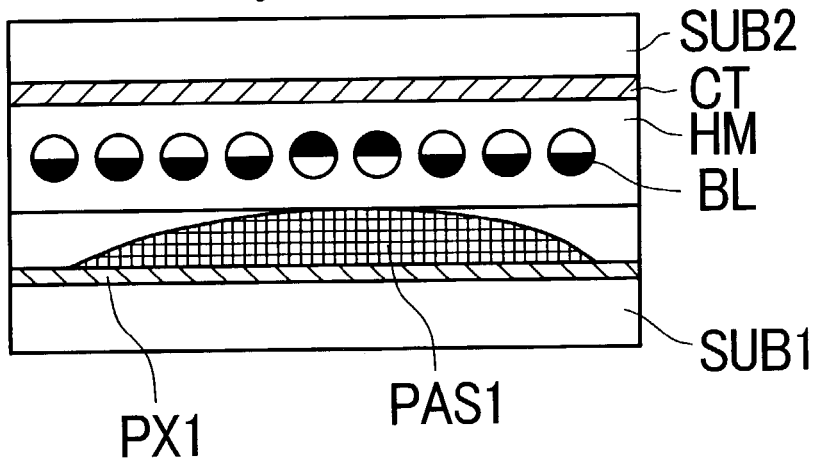

FIG. 17C and FIG. 18C show the bright half tone state. In this state, as one example, −15V is applied to electrode PX1 and 0V is applied to the reference electrode CT. Since the voltage difference between the electrodes is enlarged, the reverse rotation of the electronic balls BL extends to the region where the film thickness of the dielectric layer PAS1 is thick. As shown in FIG. 18C, the display assumes a white state except for the center portion, which corresponds to a portion of the dielectric layer PAS1 which has the largest thickness, so that a bright half tone image is obtained.

The feature of this embodiment lies in the local provision of a dielectric body on one electrode, and the dielectric body may have a dielectric constant that is higher than that of the element around the dielectric body. In this case, contrary to the case shown in FIGS. 18A to 18C, the constitution which enlarges the white region, corresponding to the voltage difference from the center portion to the periphery, is adopted.

In the constitution shown in FIGS. 17A to 17C, the dielectric layer PAS1 is arranged longitudinally. In this case, a difference in distance is generated between the white region and the black region, as shown in FIG. 18B, for example; and so there may be a case in which the black and white regions are individually recognizable with the naked eye, depending on the size of the pixel.

Figure 19A:
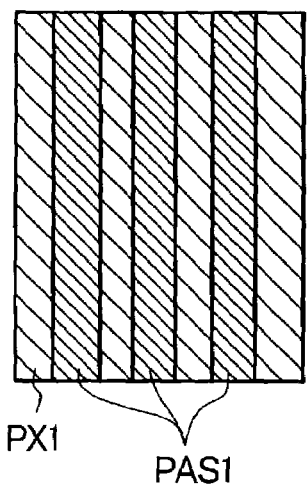
FIGS. 19A to 19C are diagrammatic plan views of a pixel of an image display device according to another embodiment of the present invention.
Figure 19B:
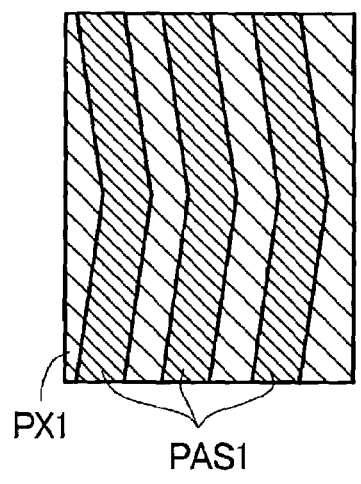
Figure 19C:
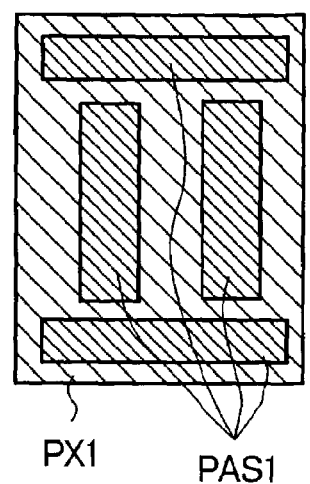

FIGS. 19A to 19C show an example which can solve such a drawback. FIG. 19A shows a structural arrangement in which a plurality of longitudinally elongated dielectric layers PAS1 are formed. Due to such a configuration, it is possible to narrow the distance between the black portion and the white portion; and, hence, the averaging effect when viewed with the naked eye is enhanced, whereby a uniform pixel display is obtained.

FIG. 19B shows a structural arrangement in which, in addition to the above-mentioned feature, the dielectric layers PAS1 have a bent shape. Due to such configuration, the black regions and the white regions further cross each other in space, and, hence, a further uniform display is obtained.

FIG. 19C is an example in which the dielectric layers PAS1 are arranged not only in the longitudinal direction, but also in the lateral direction. Although the vision of human being has viewing-angle characteristics such that a human can easily distinguish stripes extending in one direction, but this ability to distinguish is decreased when stripes are present in a plurality of directions. In the arrangement shown in FIG. 19C, by arranging the dielectric layers PAS1 in both the longitudinal direction and the lateral direction, the black region and the white region cross each other in space, so that a uniform display is obtained. Further, by making use of the above-mentioned vision effect, a more uniform constitution in view of the viewing angle is obtained.

Embodiment 12

Figure 21B:
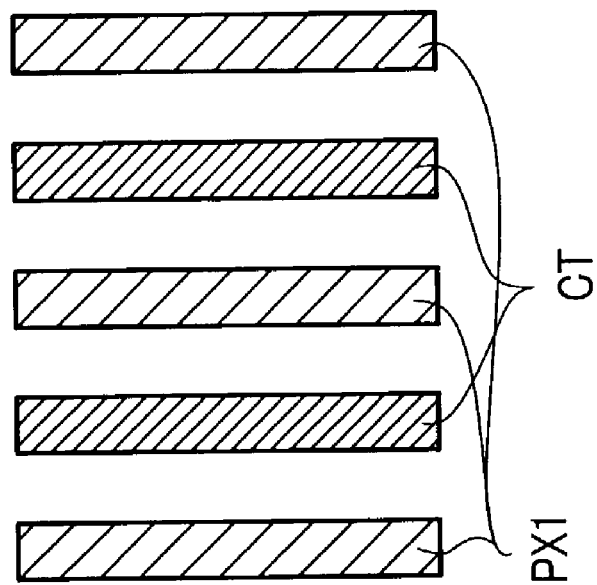
FIG. 21A is a diagrammatic cross-sectional view and FIG. 21B is a diagram of a pixel of an image display device according to another embodiment of the present invention.
Figure 21A:
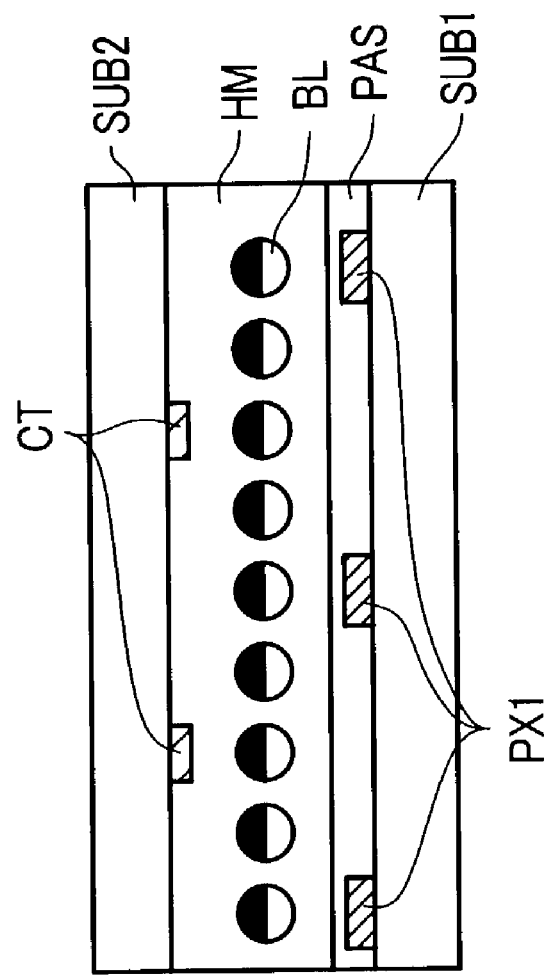

FIGS. 21A and 21B show an embodiment in which the electrodes PX1 and PX2 are formed on separate substrates, wherein the electrode PX1 is formed on the substrate SUB1 and the reference electrode CT is formed on the substrate SUB2 in place of the electrode PX2. FIG. 21A is a cross-sectional view corresponding to FIG. 3A and FIG. 21B is a plan view.

Also, with the use of this structural arrangement, it is possible to obtain an advantageous effect similar to the advantageous effect obtained by the structure shown in FIG. 3A.

Further, in forming both the electrodes PX1 and PX2 on the substrate SUB1, there exists a drawback in that the wiring becomes complicated. This arrangement can simplify the structure, so that the manufacture of the image display device is facilitated.

Embodiment 13

Figure 22A:
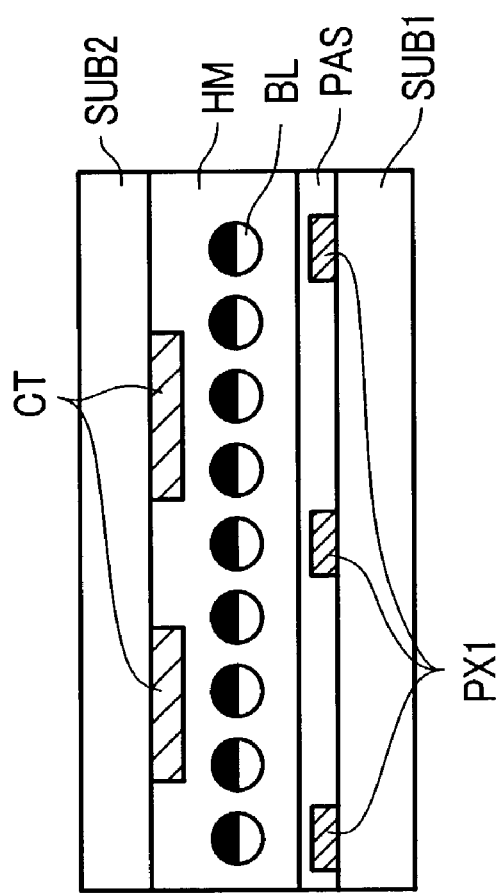
FIG. 22A is a diagrammatic cross-sectional view and FIG. 22B is a diagram of a pixel of an image display device according to another embodiment of the present invention.
Figure 22B:
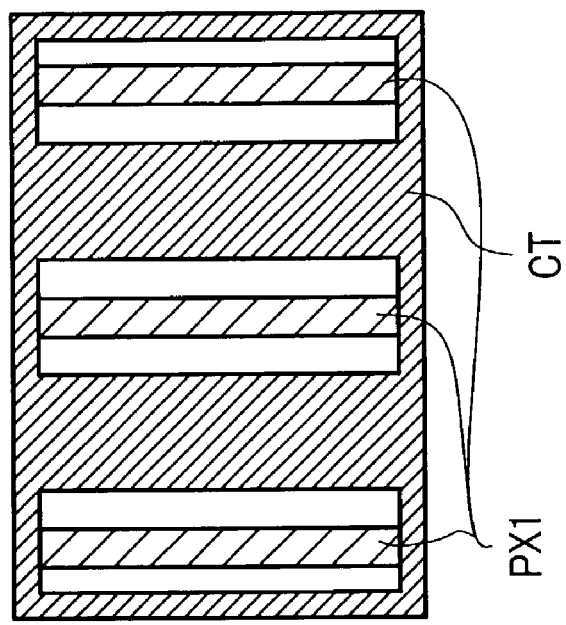

FIGS. 22A and 22B show a modification of the embodiment shown in FIGS. 21A and 21B. A view corresponding to FIG. 21A is shown in FIG. 22A and a view corresponding to FIG. 21B is shown in FIG. 22B.

Here, the electrodes PX1 are formed on the substrate SUB1 and the reference electrodes CT are formed on the substrate SUB2. The structural arrangement which makes this modification different from the embodiment shown in FIG. 21A lies in the fact that the reference electrodes CT are formed in a planar shape and hole portions are formed in the reference electrodes CT.

Due to such a construction, it is possible to reduce the resistance value of the reference electrodes CT. Since light is incident on the electronic balls BL at the reference electrode CT side, and the reference electrode CT side constitutes a path through which light which is reflected on the electronic balls BL is emitted, the luminance of the spectral transmissivity of the reference electrode CT is reduced. Accordingly, the enhancement of the transmissivity of the reference electrode CT contributes to the enhancement of the luminance. Accordingly, by forming the reference electrode CT in a planar shape and by forming holes in the reference electrode CT partially such that the hole portions face the electrodes PX1, the electricity supply resistance of the reference electrode CT can be decreased. Accordingly, a reduction of the film thickness of the reference electrode CT can be realized, so that the brighter display can be realized.

Embodiment 14

FIG. 23 shows an example of an image display device which is applicable to the respective embodiments of the present invention. An image display element which uses electronic balls is constituted of a substrate SUB1 and a substrate SUB2. A driving circuit DR is mounted on the substrate SUB1. A frame FM is formed on an end portion of the image display element. Due to such a structural arrangement, the protection of the driving circuit DR is ensured.

The frame FM may be formed on the whole back surface of the substrate SUB1. This is because of the fact that, when the display surface is provided at the substrate SUB2 side, the incidence of light from the substrate SUB1 side and a reflection function are not necessary.

Embodiment 15

The image display device which uses electronic balls has the feature that the image can be held for a long period of time. Although this feature is a great advantage in such an image display device, this feature has an intrinsic drawback. That is, to display the same image for a long period of time implies that this state is liable to be fixed. Accordingly, a so-called image retention phenomenon occurs even when the screen is changed over to another image after displaying of the same image for a long period of time, such that the previous image still remains as an image.

In the conventional image display device which uses electronic balls, only a binary display consisting of white and black is adopted. In this case, the changeover of the screen involves only black and white after all, and, hence, the image retention is at a level which can be ignored when viewing the screen with the naked eye. However, in producing a half tone display, the voltage difference, or the previous display image, relative to the rotational threshold value of the electronic balls influences the display image, and, hence, it is desirable to provide a structure which is able to cope with the problem of image retention.

In the conventional image display device using electronic balls, two electrodes are separately arranged on the upper substrate and the lower substrate in such a way that these electrodes face each other in an opposed manner and inverse rotation of the electronic balls is produced by the electric field generated on the substrate in the longitudinal direction. Accordingly, the conventional image display device adopts a structure in which the polarity which provides the black display and the polarity which provides the white display are fixed and cannot be changed.

On the contrary, the present invention proposes a novel structure which can effect a change in the polarity without changing the display image.

An example of a device which can effect a change in the polarity without changing the display in the embodiment shown in FIG. 1A will be explained in conjunction with FIGS. 24A and 24B.

FIG. 24A shows an example in which 0V is applied to the reference electrode CT, a minus voltage is applied to the electrode PX1 and a plus voltage is applied to the electrodes PX2. In this case, the electronic balls assume the half tone state with the arrangement shown in FIG. 24A.

FIG. 24B shows the example in which 0V is applied to the reference electrode CT, a plus voltage is applied to the electrode PX1 and a minus voltage is applied to the electrodes PX2. In this case, the electronic balls assume the half tone state in the same manner as the case shown in FIG. 24A. However, the relationship of white and black of the electronic balls on the electrodes and the direction of the black portions of the electronic balls between the electrodes are reversed. That is, it is possible to realize a changeover of the polarity without changing the display state. With such a technique, it is possible to realize a structure which can prevent the generation of image retention attributed to display with the same polarity for a long period of time in the half tone state.

Here, it is desirable that the changeover of the polarity of the electrodes PX1 and PX2 is performed periodically. Due to such periodic changeover, image retention can be prevented in a stable manner, so that it is possible to provide the highly reliable image display device.

FIGS. 25A and 25B show an example in which changes in the polarity are affected in the embodiment shown in FIG. 3A. FIG. 25A shows an example in which a minus voltage is applied to the electrode PX1 and a plus voltage is applied to the electrodes PX2. On the other hand, FIG. 25B shows an example in which the polarities of the electrodes PX1 and PX2 are reversed. In both examples shown in FIG. 25A and FIG. 25B, in the same manner as the relationship between FIG. 24A and FIG. 24B, it is possible to change over the polarity between electrodes without changing the display in a half tone state so that image retention can be prevented.

The basic concept of this embodiment lies in the fact that, in the display device using electronic balls, the polarity of the electric field or the polarity of the voltage is changed over without changing the displayed image. Accordingly, any structure and any driving method which can realize the basic concept belongs to the category of this example.

Embodiment 16

Another embodiment of the electronic balls of the present invention is shown in FIGS. 26A and 26B. FIG. 26A is a view in which the electronic ball is viewed from the oblique direction, and FIG. 26B is a view in which the electronic ball is viewed from the side direction. The electronic ball is formed in a columnar shape and a half surface thereof is colored. Due to such a configuration, the reflection region can be enlarged so that an image display device having more brightness can be provided.

The disclosed structural arrangements of the respective embodiments of the present invention also include modifications thereof so long as the modifications are based on the inventive concept. Active elements may be formed on the substrate SUB1. Either one or both of the electrodes PX1 and PX2 may be controlled using active elements. Due to such a construction, the image display device can produce a display of higher definition. In this case, it is possible to apply the concept of a TFT substrate, such as used in a liquid crystal display device or an organic EL display device, and a case in which the embodiments of the present invention are combined with this concept is included in the scope of disclosure of the present invention.

As has been explained in detail heretofore, according to the present invention, it is possible to realize an image display device which can produce a multiple gray scale display using electronic balls.

It is also possible to realize multi-colored display of not less than 64 colors. It is also possible to realize the broadening of the viewing angle of the image display device. It is also possible to solve the image retention problem. It is also possible to provide the bright image display device by enhancing the reflectance.

What is claimed is:

1. An image display device comprising:
   a first substrate and a second substrate;
   spherical bodies which are sandwiched between the first substrate and the second substrate and are rotatable, each spherical body having at least two regions formed by dividing the spherical body in color;
   first electrodes which are formed on one of the first substrate and the second substrate, and second electrodes which are formed on the one of the first substrate and the second substrate; and
   a display is produced by applying a voltage difference between the first electrodes and the second electrodes;
   wherein the display enables a multiple gray scale display of at least 4 gray scales.

2. An image display device comprising:
   a first substrate and a second substrate;
   spherical bodies which are sandwiched between the first substrate and the second substrate and are rotatable, each spherical body having at least two regions formed by dividing the spherical body in color; and
   first electrodes and second electrodes which are formed on the first substrate, and at least one of third electrodes formed on the second substrate; wherein
   a voltage difference is imparted between at least one of the first electrodes, the second electrodes and at least one of the third electrodes so as to control rotation of at least one of the spherical bodies.

3. An image display device comprising:
   a first substrate and a second substrate;
   spherical bodies which are sandwiched between the first substrate and the second substrate and are rotatable, each spherical body having at least two regions formed by dividing the spherical body in color;
   first electrodes which are formed on at least the first substrate and at least one second electrode formed on the second substrate; wherein
   the at least one second electrodes is a planar electrode and the first electrodes are linear electrodes, and a number of the linear first electrodes is at least twice a number of the at least one planar second electrode.

4. An image display device according to claim 1, wherein the first electrodes and the second electrodes are formed in a linear shape.

5. An image display device according to claim 2, wherein the first electrodes and the second electrodes are formed in a linear shape and the third electrodes are formed in a planar shape.

6. An image display device according to claim 1, wherein at least one of the first electrodes and the second electrodes have an L shape.

7. An image display device according to claim 1, wherein the second electrode is sandwiched by two first electrodes, the first electrodes are arranged in parallel to each other, and the second electrode is extended in an oblique direction with respect to the first electrode.

8. An image display device according to claim 1, wherein the second electrode is sandwiched by two first electrodes, the first electrodes are arranged in parallel to each other, the second electrode has a portion which is parallel to the first electrodes and a portion which is not parallel to the first electrodes, and a distance of the parallel portion of the second electrode with respect to the first electrodes has a plurality of values in the extending direction of the first electrodes.

9. An image display device according to claim 1, wherein at least one of the first and second electrodes is a linear electrode which is arranged at a side remote from a display surface.

10. An image display device according to claim 1, wherein a transparent conductive layer is formed on a front side of the viewer-side substrate.

11. An image display device according to claim 1, wherein a touch panel is formed on a front side of the viewer-side substrate.

12. An image display device according to claim 1, wherein each spherical body has a black region and a white region.

13. An image display device according to claim 1, wherein each spherical body has a black region and a region which is colored in any one of red, green and blue.

14. An image display device according to claim 1, wherein each spherical body has a black region and a region which is colored in any one of cyan, magenta and yellow.

15. An image display device according to claim 13, wherein the colors of the colored regions differ for respective pixels which are arranged close to each other in the lateral direction of the image display device.

16. An image display device according to claim 2, wherein the first electrodes and the second electrodes are formed in a linear shape.

17. An image display device according to claim 2, wherein
    at least one of the first electrodes and the second electrodes have an L shape.

18. An image display device according to claim 3, wherein at least one of the first electrodes and the second electrodes have an L shape.

* * * * *